(12) United States Patent
Andreev et al.

(10) Patent No.: US 9,846,178 B2
(45) Date of Patent: *Dec. 19, 2017

(54) CHEMICAL NANO-IDENTIFICATION OF A SAMPLE USING NORMALIZED NEAR-FIELD SPECTROSCOPY

(71) Applicant: BRUKER NANO, INC., Tucson, AZ (US)

(72) Inventors: Gregory Andreev, Austin, TX (US); Sergey Osechinskiy, Goleta, CA (US); Stephen Minne, Goleta, CA (US); Chanmin Su, Goleta, CA (US)

(73) Assignee: BRUKER NANO, INC., Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/241,029

(22) Filed: Aug. 18, 2016

(65) Prior Publication Data

US 2016/0356809 A1 Dec. 8, 2016

Related U.S. Application Data

(62) Division of application No. 14/773,135, filed as application No. PCT/US2014/028927 on Mar. 14, 2014, now Pat. No. 9,448,252.

(Continued)

(51) Int. Cl.
*G01Q 60/18* (2010.01)
*G01Q 30/04* (2010.01)
(Continued)

(52) U.S. Cl.
CPC .............. *G01Q 30/04* (2013.01); *G01Q 20/02* (2013.01); *G01Q 60/18* (2013.01); *G01Q 60/22* (2013.01)

(58) Field of Classification Search
CPC ........ G01Q 20/02; G01Q 60/18; G01Q 60/22; B82Y 20/00; B82Y 35/00
See application file for complete search history.

(56) References Cited

U.S. PATENT DOCUMENTS 8,646,110 B1 * 2/2014 Xu ....................... G01B 9/0203
250/234
8,793,811 B1 * 7/2014 Prater .................... G01Q 20/02
73/105

(Continued)

FOREIGN PATENT DOCUMENTS

EP 1770714 A1 4/2007
EP 2613159 A1 10/2013

OTHER PUBLICATIONS

Barchiesi, Dominique, et al. "Reflection scanning near-field optical microscopy (R-SNOM) in constant height mode with a dielectric probe Image interpretation and resolution for high topographic variations." Ultramicroscopy 71.1 (1998): 361-370.*

(Continued)

*Primary Examiner* — Wyatt Stoffa
(74) *Attorney, Agent, or Firm* — Yakov S. Sidorin; Quarles & Brady LLP

(57) ABSTRACT

Apparatus and method for nano-identification a sample by measuring, with the use of evanescent waves, optical spectra of near-field interaction between the sample and optical nanoantenna oscillating at nano-distance above the sample and discriminating background backscattered radiation not sensitive to such near-field interaction. Discrimination may be effectuated by optical data acquisition at periodically repeated moments of nanoantenna oscillation without knowledge of distance separating nanoantenna and sample. Measurement includes chemical identification of sample on nano-scale, during which absolute value of phase corresponding to near-field radiation representing said interaction is measured directly, without offset. Calibration of apparatus and measurement is provided by performing, prior to sample (Continued)

measurement, a reference measurement of reference sample having known index of refraction. Nano-identification is realized with sub-50 nm resolution and, optionally, in the mid-infrared portion of the spectrum.

16 Claims, 11 Drawing Sheets

Related U.S. Application Data

(60) Provisional application No. 61/800,165, filed on Mar. 15, 2013.

(51) Int. Cl.
*G01Q 20/02* (2010.01)
*G01Q 60/22* (2010.01)

(56) References Cited

U.S. PATENT DOCUMENTS

| | | | |
|---|---|---|---|
| 9,043,946 B2* | 5/2015 | Ocelic | G01Q 30/06 850/1 |
| 2003/0147083 A1* | 8/2003 | Hill | G02B 21/0056 356/491 |
| 2008/0285041 A1* | 11/2008 | Ocelic | B82Y 20/00 356/450 |
| 2010/0290055 A1* | 11/2010 | Kim | G01N 21/1717 356/453 |
| 2011/0303824 A1* | 12/2011 | Grbic | B82Y 20/00 250/208.1 |
| 2014/0165237 A1* | 6/2014 | Tachizaki | B82Y 20/00 850/30 |
| 2015/0089694 A1* | 3/2015 | Ocelic | G01Q 30/06 850/30 |
| 2015/0308947 A1* | 10/2015 | Xu | G01B 9/0203 850/1 |
| 2016/0033547 A1* | 2/2016 | Raschke | G01Q 10/00 850/6 |

OTHER PUBLICATIONS

Ocelic Nenad, et al., "Pseudoheterodyne detection for background-free near-field spectroscopy", Applied Physics Letters, American Institute of Physics, US, vol. 89, No. 10, Sep. 8, 2006 pp. 101124-101124.

* cited by examiner

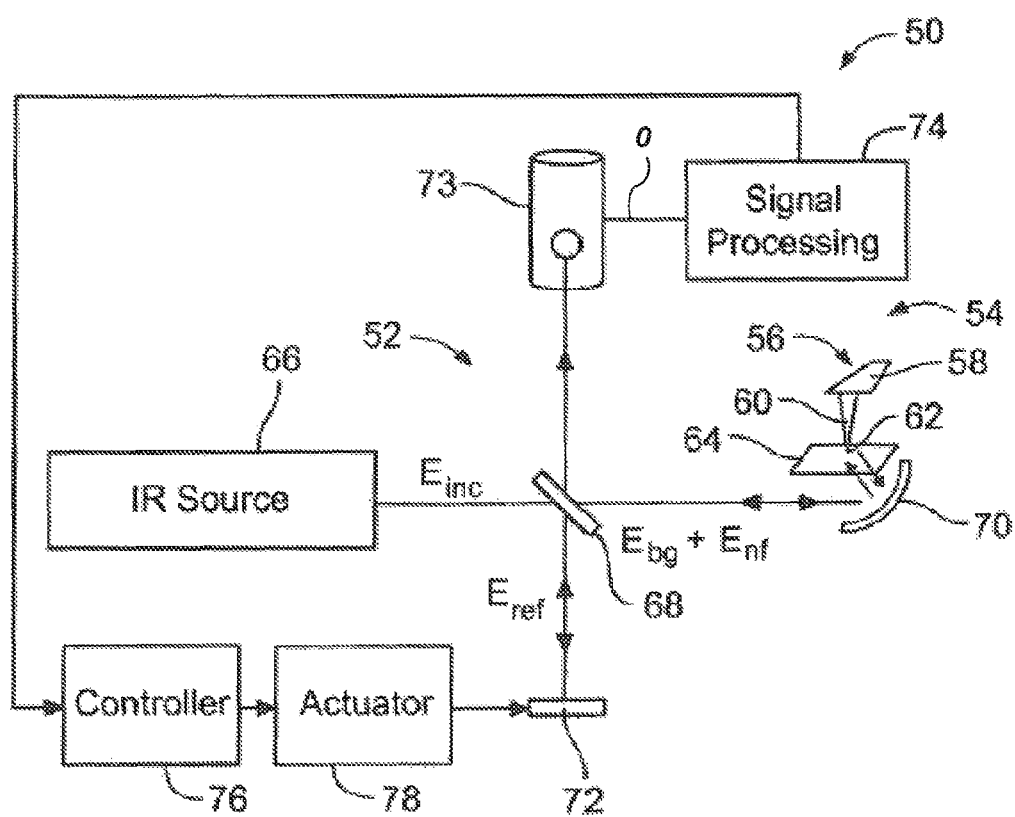
FIG. 2

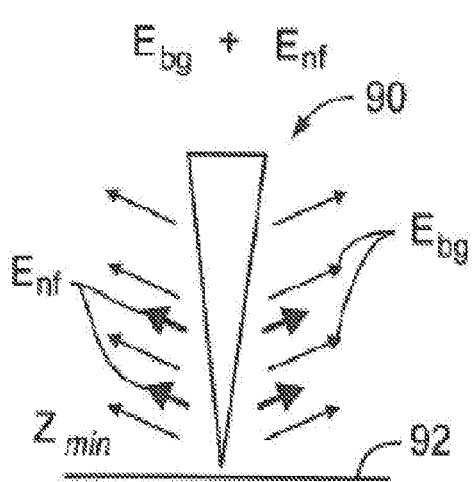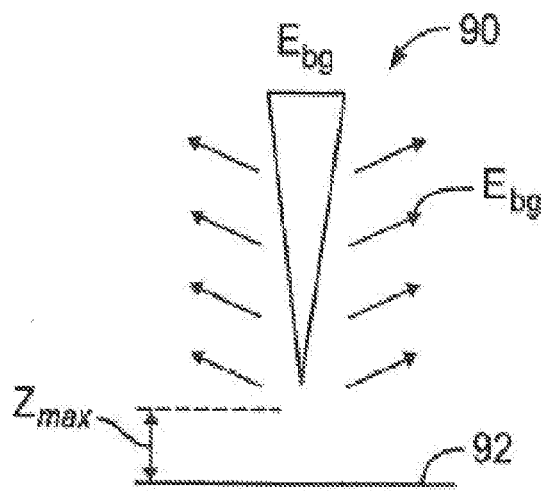
FIG. 3B
FIG. 3A

CHEMICAL NANO-IDENTIFICATION OF A SAMPLE USING NORMALIZED NEAR-FIELD SPECTROSCOPY

CROSS-REFERENCE TO RELATED APPLICATIONS

This application is a divisional from pending U.S. patent application Ser. No. 14/773,135 published as U.S. 2016/0018437, which is a national stage of International Patent Application No. PCT/US2014/028927 published as WO 2014/144496, which in turn claims priority from and benefit of U.S. Provisional Patent Application No. 61/800,165. The disclosure of each the above-identified patent application is incorporated herein by reference in its entirety.

TECHNICAL FIELD

The present invention is directed to nano-identification (nano-ID) of a sample, nano-ID measurements of sample properties, and, more particularly, to using an optical antenna in an instrument providing optical characterization of a sample with the use of evanescent waves, on a spatial scale below 50 nm or even below 20 nm.

RELATED ART

The monitoring of interaction between radiation and a sample under test (SUT) subjected to the radiation is employed—in various circumstances—to extract information concerning the SUT. In spectroscopy, for example, physical properties of the SUT (such as temperature, mass and material composition) are often assessed based on the analysis of dispersion of light emanating from the SUT.

Conventional infrared (IR) spectroscopy is a widely used technique to measure characteristics of material in polymer science and biology (on a highly localized scale of biological organelles or smaller), for example, and to identify materials based on their unique IR signatures. In many cases the unique signatures of IR spectra can be used to identify unknown material. IR spectroscopy is performed on bulk samples, which provides compositional information but not structural information, and allows collection of IR spectra with resolution on the scale of many microns, limited by diffraction of light. While near-field scanning optical microscopy (NSOM) has been applied to some degree in IR spectroscopy and imaging, it is still in need of a sensitive and reliable commercially-available instrument capable of acquiring routine IR spectra to enable the acquisition of information about the composition of the sample (such as location of different material components or molecular structures across the sample, for example) with resolution below the diffraction limit.

Despite the ongoing progress in the development of imaging techniques with spatial resolution beyond the diffraction limit, spectroscopic implementations delivering chemical specificity and sensitivity on the molecular level have remained challenging. The use of far-field localization techniques employing data reconstruction based on point-spread function can potentially achieve spatial resolution down to about 20 nm but only in the visible—and not IR portion of the spectrum—as such techniques typically rely on fluorescence from discrete molecular or quantum dot emitters. A person of ordinary skill in the art will readily understand, therefore, that application of such techniques, which do not utilize IR light advantageous for chemical ID, provide very limited access to chemically-specific information about the sample.

Scanning near-field optical microscopy (SNOM) provides sub-diffraction-limited resolution through the use of tapered fibers or hollow waveguide tips. While this method achieves spatial resolution of up to $\frac{1}{30}$ of a wavelength of operation in the visible portion of the spectrum, serious practical problems exist with extending the method to the IR portion of the spectrum. Among these practical problems there are, for instance, 1) the lack of fiber optics suitable for transmitting IR light in a broad band of, for example, mid-range of IR spectrum between about 3 microns and about 12 microns, and 2) wavelength limited resolution in the IR, typically about $\frac{1}{10}$ of the wavelength of interest. As a result, the sensitivity and resolution of the SNOM suffer, generally making aperture-based SNOM unsuitable for spectroscopic techniques in the infrared portion of the spectrum.

As an alternative to confining light inside the aperture, it is possible to perform apertureless SNOM where light is incident on a polarizable optical antenna (such as, for instance, a metallized tip of the AFM). This technique is referred to as scattering-type scanning near-field optical microscopy (s-SNOM). In s-SNOM, no IR-light compatible fibers are required and the resolution is limited only by the sharpness of the optical antenna. When embodied in a scanning probe microscope, s-SNOM combines the spatial resolution capability of AFM with the chemical sensitivity of optical spectroscopy. It has been shown that information about the local optical field can be used by the s-SNOM system to determine the distribution of a sample's complex-valued dielectric function with spatial resolution of a few tens of nanometers.

Most commonly, a sharp metal tip of an s-SNOM system is brought within close proximity to a samples surface, and the tip-sample ROI is illuminated with an external laser beam, creating a region of enhanced electric near-field. Upon scattering from this ROI, amplitude and/or phase of light change (relative to those of the incident light) as being dependent on the local dielectric properties of the sample and the local optical field illuminating the tip. There is interest in measuring the amplitude and phase changes separately, since these signals contain different but complimentary information about the sample.

While the concept of s-SNOM is well established, the use of the method is still limited due to remaining practical shortcomings a most common of which is that the collected signal is typically weak, and often competes with strong background radiation caused by stray light and scatter by spatial regions other than the ROI (which corresponds to the near-field of the sample).

The background signal, therefore, has to be suppressed. One method of background suppression involves modulation of the tip-sample separation distance (which is usually accomplished by vibrating an AFM cantilever at its resonance frequency). This creates an optical modulation of the collected light, which is then demodulated at higher harmonics of the tip vibration frequency. As a result of such filtering-out of the background radiation, what is left is the sough-after data representing light predominantly scattered from the near-field ROI of the sample. The tip modulation technique may be combined with homodyne or heterodyne interferometry, both of which can be employed to measure the amplitude and phase of the scattered light.

While both heterodyne and pseudoheterodyne s-SNOM variants of the measurements have been applied to a variety of problems (including nondestructive mapping of complex dielectric properties and mapping complex fields in characterization of nanophotonic devices), they remain prone to two main shortcomings. The heterodyne s-SNOM is operably complicated, as it requires the use of a secondary collinear source (usually generated by a pair of acousto-optic modulators). At the same time, both measurement variants require demodulation of sidebands of the resonance harmonics, which, in turn, requires the generation of a phase-locked reference signal. In addition, the difficulty of optimizing these techniques against pointing instability in the interferometer, detector nonlinearity, and signal drift and vibration exacerbate the difficulties of producing accurate quantitative results.

Moreover, in a standard implementation of the s-SNOM the direct illumination of the tip of a probe results in a three to four orders of magnitude loss in excitation efficiency, caused primarily by the mode mismatch between the diffraction-liming focal distribution of excitation far-field and the near-field localization (which is desired to be at a tens of nanometers spatial scale) as determined by the tip apex radius. Put differently, it is practically challenging to directly illuminate only the apex of the tip—the source of useful back-scattered emission—and not the whole tip. The resulting loss of sensitivity, together with a far-field background signal, often limit contrast of the useful signal and may cause imaging artifacts, confining and restricting the implementation of a wider range of spectroscopic techniques in s-SNOM.

It is appreciated, therefore, that a general solution for optical nano-imaging and spectroscopy requires a true nano-localized light source. While this can be achieved with the use of a nanoscopic emitter (in the form of a single molecule, quantum dot, or nanostructure) appropriately placed at the apex of a tip, the use of such emitter would depend on its quantum efficiency and spectral characteristics. Moreover, the use of such emitted does not solve the problems caused by the presence of intrinsic background and limitation of sensitivity of the system.

Other limitations of known near-field spectroscopy instruments include:

i) a need for a presence of a reference region on the sample (such as an incrustation of a reference material) within less than about 250 microns from the sample region being measured, to provide reliable normalization of the acquired data: some samples simply may not have suitable reference regions over a broad frequency range, such as polymer composites, for instance;

ii) weak near-field signals: pseudoheterodyne s-SNOM techniques often utilize double demodulation of the interferometer signals, which causes the lower sidebands (contributing to the magnitude of the useful near-field signals) being discarded from data-processing;

iii) slow near-filed-signal data acquisition time, limited by the response time of an element modifying the optical path of the reference arm of the interferometer used with the s-SNOM system, and iv) high costs of available laser sources.

The state of the art of chemical identification possesses a capability of spatial resolution of about 2 microns. Given the interest in spectroscopy-related characteristics of samples on a much smaller scale (on a molecular level for the purposes of chemical identification, chemical specificity and sensitivity, for example), there is a need for a system and methodology that expand the range and efficiency of performing optical characterization (whether in the visible or IR portions of the spectrum) with the use of evanescent waves on nano-scale. In particular, a need in a method and device for performing reference-free nano-ID of a sample with the use of IR spectroscopy on a spatial scale below 50 nm or even below 20 nm remains unmet.

SUMMARY

Embodiments of the present invention provide a method for optical characterization of a sample (SUT) using evanescent waves. Such method includes detecting, with an optical detector unit, an optical signal interferometrically formed by (i) first electromagnetic radiation backscattered by a nanoantenna in response to being incident electromagnetic radiation, the nanoantenna being controllably movable above a surface of the SUT, and (ii) second electromagnetic radiation representing a portion of the incident electromagnetic radiation that is delayed with respect to the first electromagnetic radiation. As a result of such detection, an optical data output is formed by the optical detector unit. The method additionally includes processing said optical data output in time domain to extract a first portion of said optical data output that represents electromagnetic field caused by near-field interaction between the nanoantenna and the surface during a motion of the nanoantenna above the SUT. The motion may include a non-sinusoidal oscillation of the nanoantenna above the surface.

In a specific case, a method may further include a step of normalizing the first portion of the optical data output by reference optical data. The reference optical data used for such normalization have been interferometrically acquired in a process of backscattering of the incident radiation by the nanoantenna moving above a surface of a reference sample. The normalization enables determination of at least one of real and imaginary parts of a complex-valued difference between first and second values of electric field characterizing said near-field interaction, which first and second values respectively correspond to first and second phases of the motion of the nanoantenna. The step of normalization may include determining a spectral distribution of the at least one of real and imaginary parts to identify a component of a complex-valued permittivity of the SUT. In addition, the motion of the nanoantenna may include scanning of the surface within a scanning range. The reference sample a measurement of which is used for normalization is located outside of the scanning range during the process of detection of the optical signal interferometrically defined by the SUT.

The method may additionally include a step of determining at least one of real and imaginary parts of a complex-valued difference between first and second values of electric field that characterizes said near-field interaction to identify a component of a complex-valued permittivity of the SUT based on said complex-valued difference. The method may additionally include a step of suppressing a contribution of background electromagnetic radiation to the first portion of the optical data output to obtain a second portion of the optical data in which said contribution is reduced as compared to the first portion of the optical data. Such suppressing may include a step of determining of the first portion of the optical data output at first, second, third and fourth phases of said motion as respective first, second, third, and fourth values, and further determining a difference between a sum of the first and third values and a sum of the second and fourth values.

Alternatively or in addition, the motion of the nanoantenna may include a recurring motion, and the method may include a step of negating a contribution of the background electromagnetic radiation by irradiating the nanoantenna with pulsed laser light only at moments corresponding to a chosen phase of the recurring motion and, in particular, only at moments corresponding to a phase that has been chosen without knowledge of a separation distance between the nanoantenna and the surface corresponding to the chosen phase. Alternatively or in addition, the motion of the nanoantenna may include a recurring motion while the method includes a step of negating a contribution of said background electromagnetic radiation by irradiating the nanoantenna with light from a CW laser source and detecting said optical signal only at the moments corresponding to a chosen phase of the recurring motion. Specifically, such phase is chosen without knowledge of a separation distance between the nanoantenna and the surface corresponding to the chosen phase.

An embodiment of the method may additionally include integrating the optical data output during a predetermined amount of time while interferometrically controlling a phase delay between the first and second electromagnetic radiations to improve a signal-to-noise ratio that characterizes the first portion of the optical data output. Alternatively or in addition, the incident radiation may include a plurality of wavelengths while the second electromagnetic radiation is delayed with respect to the first electromagnetic radiation by a phase-delay that is being modulated. The optical data output representing the interferometrically formed optical signal can be analyzed, in such case, using a spectral analysis method (such as Fourier Transform based method) and further comprising analyzing said optical data output representing the interferometrically formed optical signal with the use of spectral analysis while the second electromagnetic radiation is delayed with respect to the first electromagnetic radiation by a phase-delay that is being modulated. The modulation of the phase-delay can be effectuated by continuous change of the optical path in a reference arm of an interferometer according to a periodic function characterized by a modulation frequency. The periodic function, in a specific implementation, may include at least one of linear and sinusoidal functions. Alternatively or in addition, the motion of the nanoantenna may include an oscillation above the surface at an oscillation frequency, and the spectral analysis of the interferometrically formed optical signal can be carried out at frequencies representing a combination of a multiple of the modulation frequency and a multiple of the oscillation frequency.

An embodiment of the method may include determining amplitude and phase of electric field representing said near-field interaction from the first portion of the optical data output to ascertain a dielectric constant parameter and an absorption parameter characterizing the SUT.

Embodiments of the invention further provide a method for optical characterization of a sample (SUT) using evanescent waves, which includes irradiating a region of interest (ROI) with the incident electromagnetic radiation (where the ROI contains a sample region of the SUT and a nanoantenna positioned at a separation distance with respect to the sample region) and acquiring target optical data representing near-field interaction between the nanoantenna and the sample region at one or more wavelengths associated with the electromagnetic radiation, based on (i) a first portion of the incident electromagnetic radiation that has been backscattered by the ROI and (ii) reference optical data representing near-field interaction of said nanoantenna and a reference material. The nanoantenna is enabled to scan said sample region within a scan range. The step of acquiring the target optical data is effectuated with the use of an interferometer and an optical detector. The reference material is located, at the time of said irradiating an ROI, outside the scan range and, particularly, at least 250 microns away from the sample region being characterized. In a specific case, the reference sample is not physically connected to the SUT.

The irradiating may include irradiating the ROI with light from a pulsed laser source while varying said separation distance at a frequency corresponding to a resonant frequency characterizing the nanoantenna. Alternatively or in addition, the method may include adjusting at least one of first and second arms of the interferometer such that a phase of an optical signal (which optical signal represents the near-field interaction of the nanoantenna and the reference material and which propagates through the first arm of the interferometer) is made substantially equal to a phase of light propagating through the second arm of the interferometer. The method may further include a step of normalizing the target optical data (that has been acquired under conditions when a difference between a first phase of optical signal representing the near-field interaction between the nanoantenna and the sample region and the phase of light propagating through the second arm is about pi/2), by the reference optical data to extract an imaginary component of an electric field representing the near-field interaction between the nanoantenna and the sample region.

Embodiments of the invention further provide a method, for optical characterization of a sample (SUT) using evanescent waves, that contains (i) irradiating a region of interest (ROI) with the incident electromagnetic radiation, where the ROI includes a sample region of the SUT and a nanoantenna positioned at a separation distance with respect to the sample region, and wherein the nanoantenna is enabled to scan the sample region within a scan range and is in recurring motion above the sample region. The method further includes interferometrically acquiring (with the use of interferometer and an optical detector), in time-domain, target optical data representing near-field interaction between the nanoantenna and the sample region at one or more wavelengths associated with the incident electromagnetic radiation. Such interferometric acquisition is based on (a) a first portion of the incident electromagnetic radiation that has been backscattered by the ROI, and (b) reference optical data representing near-field interaction of the nanoantenna and a reference material. The method further includes a step of normalizing the target optical data (that have been acquired under conditions where a difference between a first phase and a second phase is about pi/2) to extract the imaginary component of a difference between first and second magnitudes of electric field characterizing the near-field interaction. The first phase is a phase of an optical signal representing the near-field interaction between the nanoantenna and the sample region. The second phase is a phase of an optical signal representing the near-field interaction of the nanoantenna and the reference material. The first magnitude corresponds to a first separation distance between the nanoantenna and the sample region during a cycle of the recurring motion of the nanoantenna. The second magnitude corresponding to a second separation distance between the nanoantenna and the sample region during the cycle. The irradiating may include irradiating the ROI with light from a pulsed laser source at moments corresponding to a chosen phase of cycle and without knowledge of the separation distance corresponding to said chosen phase. Alternatively or in addition, the irradiating may include irradiating the ROI with light from a CW laser source and said acquiring includes detecting interferometric distribution of light at the optical detector at moments corresponding to a predetermined phase of the cycle of the recurring motion.

Embodiments of the invention additionally provide a method for optical characterization of a sample (SUT) using evanescent waves. The method includes detecting, with an optical detector, an optical signal interferometrically formed by (i) first electromagnetic radiation backscattered by a nanoantenna in response to being incident electromagnetic radiation, while nanoantenna is controllably movable above a surface of the SUT, and (ii) second electromagnetic radiation representing a portion of the incident electromagnetic radiation, such that a difference between of phase of the second electromagnetic radiation and a phase of the first electromagnetic radiation is operably variable. As a result of such detecting, an optical data output is formed. The method further includes processing the optical data output to extract a first portion of the optical data output, which first portion represents electromagnetic field that has been caused by near-field interaction between the nanoantenna and the surface at pre-determined distances of separation between the nanoantenna and the surface during a motion of the nanoantenna above the SUT.

BRIEF DESCRIPTION OF THE DRAWINGS

The idea of the invention and examples of embodiments will be better understood in reference to the accompanying generally not-to-scale Drawings, in which like reference numerals represent like parts throughout unless stated otherwise, and in which:

FIG. 2 is a schematic diagram of a nano-identification system according to an embodiment of the present invention;

FIGS. 3A and 3B are schematic front views of an optical antenna illustrating the apex of the tip at a minimum and maximum tip-sample separation distances from the sample's surface, respectively, and background and near-field contributions the detected signal (being the inputs used in connection with the Z-gating algorithm as discussed herein);

DETAILED DESCRIPTION

Figure 1:
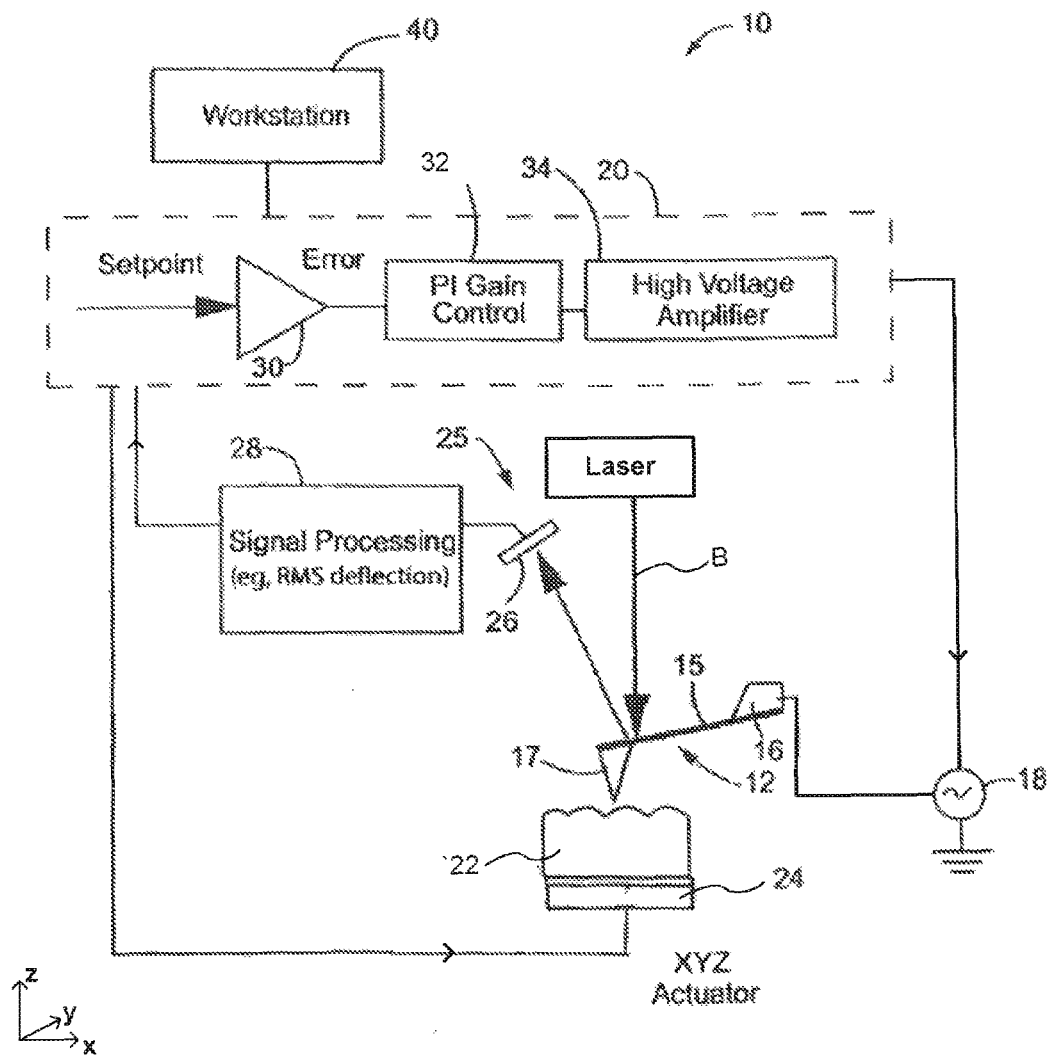
FIG. 1 is a schematic illustration of a typical AFM.

An improved apparatus and method of performing chemical identification of a sample includes using an optical antenna, such as a probe of an atomic force microscope, in an s-SNOM configuration, and a procedure for calibrating the source and interferometer to obtain normalized spectra related to the nanoscale distribution of a complex-valued index of refraction of the sample, without the necessity of having a nearby reference material. The method presented performs background suppression using real time, time domain signal processing, rather than frequency domain lock-in amplification methods (which requires demodulation of the sidebands of the resonance harmonics), as has been done previously.

The time domain processing approach enables two novel operating modes: s-SNOM operation with pulsed sources that have repetition frequencies in the KHz to MHz range, while maintaining compatibility with continuous wave (CW) and quasi-CW sources used in previous solutions; and s-SNOM operation with non-sinusoidal cantilever motions such as those used in PeakForce Tapping® ("Peak Force Tapping" is a registered trademark of Bruker Instruments, Inc.) while maintaining compatibility with conventional Tapping mode operation. The specifics of our time domain based background suppression approach are laid out in the subsequent sections where the novel concept of "Z-gating" is described, as well as how it is implemented with the real time signal processing method of Distance Correlated Signal Detection "DCSD."

In addition, our method and apparatus utilizes two techniques for greatly improving the s-SNOM workflow: "smart phase" interferometer/source calibration, and a procedure which we refer to as a "reference free" nanoscale chemical identification. The combination of all of these concepts ultimately allows one to obtain the complex valued refractive index of a sample region with an optical spatial resolution exceeding 50 nm, and even 20 nm, in a matter of minutes without the necessity of a reference region being in close proximity to the sample region, as was the case in known techniques. The term "reference-free measurement" or a similar term refers to a characterization of an area sample under test with a scanning microscope system that, in contradistinction to the existing methodologies, does not require a contemporaneous measurement of a reference, known sample that is located within the scanning range of the microscope from the area being characterized. For example, the reference-free nanoscale identification of a given sample can be effectuated as a result of an appropriate processing of the sample-under-test-related data in relation to a tabulated reference data collected at a different time and, optionally, in relation to the data characterizing a reference, known sample that is not physically in contact with or operably connected to the sample-under-test. The imaginary part of the nanoscale resolved index of refraction allows for chemical identification of materials by their absorption lines, while the real part can be utilized to distinguish materials based on their conductivity or reflectivity. Lastly, the technique is also highly sensitive to material thickness which can be utilized to perform nanoscale resolved measurements of thin films of varying thicknesses.

General Schematics of an AFM and an s-SNOM Systems.

Scanning probe microscopy is one of methodologies commonly-used in spectroscopic measurements. A Scanning Probe Microscope (SPM), such as an Atomic Force Microscope (AFM) for example, is a device employing a probe with a tip that is caused to interact with a surface of an SUT to provide assessment of changes in characteristics of the surface (on the scale down to atomic dimensions) by means of measuring the forces of such interaction during. By causing relative scanning movement(s) between the tip and the sample, surface characteristic data can be acquired over a particular region of the sample (a region of interest, ROI) and, if needed, a corresponding spatial map of such data distribution can be generated.

A typical AFM system 10 is shown schematically in FIG. 1, and employs a probe 12 that includes a cantilever 15 and a tip appended to (or even integrated with) the cantilever's end. The probe 12 is typically placed above and in close proximity to the SUT 22. Either the probe 12 and/or the SUT 22 may be juxtaposed with a scanning unit or scanner 24 that effectuates a relative motion between the probe 12 and the SUT 22 while the probe-sample interaction is being measured. Scanner 24 may include one or more actuators (whether individual or operably integrated among themselves; for example, piezoelectric tube actuators) to generate motion along several coordinates (whether linear or angular; for example, in three orthogonal directions, XYZ). In some AFMs, multiple scanners may be present: for example an XY scanner that moves the sample 22 and a separate Z-scanner that moves the probe 12. (As shown, the scanner 24 moves the SUT 22 relative to the probe 12).

Often the probe 12 may be additionally coupled to an oscillation actuator or driver 16 employed to drive the probe 14 at or near a resonant frequency of the cantilever 15. The operation of at least one of the scanner 24 and the oscillation driver 16 may be governed by electronic signal(s) received from an AC signal source 18 under control of an SPM controller 20. The governing electronic signal(s) causes (i) the actuator 16 to drive the oscillation of the probe 12 and/or (ii) the scanner to mutually reposition the probe 12 and the sample 22. The probe-sample interaction is typically controlled via feedback by controller 20. Depending on the specific details of the instrument 10, the oscillation actuator 16 may be either coupled to the scanner 24 and probe 14 only operably, or be formed integrally with the cantilever 15 as part of a self-actuated cantilever/probe arrangement.

The overall instrument is thus enabled to create relative motion between the probe and the sample while measuring the topography or some other surface property of the sample as described, for example, in Hansma et al. U.S. Pat. No. RE 34,489; Elings et al. U.S. Pat. No. 5,266,801; and Elings et al. U.S. Pat. No. 5,412,980. Alternatively or in addition, measurements of the deflection, torsion, or other motion of the cantilever 15 can be performed.

The sought-after characteristics of the SUT 22 are typically assessed by detecting changes in one or more characteristics of the oscillation of the probe 12. To detect such changes, a deflection detection apparatus 25 may be employed to direct a light beam B (laser beam, for example) towards the backside of the probe 12, which reflects the incident beam B towards a detector 26. As the beam translates across the detector 26, appropriate signals are transmitted to the controller 20 with the use of electronic signal-processing circuitry 28, which processes the signals to determine changes in the oscillation of probe 14. In general, controller 20 generates control signals to maintain a substantially constant interaction between the tip 17 and the sample 22 (or, a substantially constant deflection of the lever 15 with respect to its rest position), typically to maintain a setpoint characteristic of the oscillation of the probe 12. For example, the controller 20 is often used to maintain the oscillation amplitude at a setpoint value, As, to insure a generally constant force between the tip 17 and the sample 22. Alternatively or in addition, a setpoint phase or frequency value(s) may be used. Some typical components of the controller 20 may include a comparator 30, a PI gain controller 32, and a high-voltage amplifier 34.

The controller 20 may additionally be in operable communication or be or integrally connected with a workstation 40 and receives the collected data from the controller 20 to process/manipulate these data to perform, for example, point selection, curve fitting, and distance determining operations. Either one of the controller 20 or the workstation 40 may contain a computer processor specifically programmed to effectuate the governing of operation of the probe 12 and the scanner 24 and to perform the required data-processing operations.

In further reference to FIG. 1, an AFM may be designed to operate in a variety of modes, including a contact mode and an oscillating mode. The operation of an AFM is accomplished by moving either the sample or the probe assembly up and down relatively perpendicular to the surface of the sample in response to a deflection of the cantilever of the probe assembly as it is scanned across the surface. Scanning typically occurs in an "x-y" plane that is at least generally parallel to the surface of the sample (any particular SUT, of course, may possess surface roughness, curvature, and/or tilt that result(s) in some deviation of the SUT's surface from the plane of scanning, at least on a local scale), while the vertical movement occurs in the "z" direction that is perpendicular to the x-y plane. The data associated with this vertical motion can be optionally stored and used to form an image of the sample's surface in association with the sample's characteristic being measured. One example of such image is an image representing surface topography.

In one mode of AFM operation, known as Tapping-Mode™ AFM (TappingMode™ is a trademark of Bruker Nano, Inc.), the tip 17 is oscillated at or near a resonant frequency of the associated cantilever 15 of the probe 14. A feedback loop attempts to keep the amplitude of such oscillation constant to minimize the "tracking force," i.e., the force resulting from tip/sample interaction. Alternatively or in addition, the processor of the system 10 may be programmed to keep the phase and/or oscillation frequency constant. As in contact mode, these feedback signals are then collected, stored and used as data to characterize the sample. In a recent improvement on the ubiquitous Tapping Mode, called Peak Force Tapping (PFT) Mode, feedback is based on force as measured in each oscillation cycle.

A generalized schematic of a chemical nanoidentification system utilizing a scanning SNOM (s-SNOM) instrument is shown together with an illustration of the scattered light detected by the system, in FIGS. 2 and 3A and 3B, respectively. Referring initially to FIG. 2, the system 50 includes an AFM 54, configured to monitor the interaction between a nanoantenna 56 (such as an optically polarizable tip of the probe of the AFM 54) and the sample surface 64, and an interferometer 52 through which light scattered by the probe and/or sample is collected. The system 50 is adapted to measure scattered light that is produced in response to the near-field interaction between the tip apex 62 and the sample surface 64 when excited by light from a source 66 (for example, an IR laser). The source of IR light 66 directs an output beam characterized by electric field $E_{inc}$ towards a beam splitter 68. The beam splitter 68 transmits a portion of the output beam towards a focusing optic 70 (in one example, a parabolic mirror) that further redirects this portion of the beam (referred to herein as source light) towards the apex 62 of the AFM probe tip 60 (interchangeably referred to herein as nanoantenna) and, in this example, also collects light backscattered/returned from the tip 60. In a related embodiment, the focusing optic 70 can employ a lens or an objective and, therefore, operate in transmission. The beam splitter 68 also reflects a portion of the output beam towards an operationally-controllable optical element 72 (in one example, a piezo-actuated mirror) operable to alter the optical phase of light incident thereon relative to that of light collected from the nanoantenna 60. As described further below, corresponding light ultimately provides a reference for the spectroscopy and/or measurements provided by s-SNOM 50. For the purposes of the present disclosure, and unless specified otherwise, the term "nanoantenna" generally refers to an object having a volume of nanoscale dimensions and polarizable by electromagnetic fields (such as, for example, an object which contains a metallic/dielectric sphere of radius R<1 micron, or an object having a metallic/dielectric tip (such as the one used in AFM, or a wire, or an ellipsoid al or conical tip) with a radius of curvature R<1 micron).

When the nanoantenna is positioned sufficiently close to the sample surface, the source light redirected toward the tip 60 by the optic 70 additionally illuminates the surface 64. Accordingly, a portion of the scattered light characterized by electric field $E_{nf}$ will be related, in both amplitude and phase, to the near-field interaction between the nanoantenna 60 and region of the sample surface 64 directly below it. Another portion of the backscattered light, $E_{bg}$, which does not depend on the near-field interaction between the tip 60 and the surface 64, will also be collected by the optic 70. The total collected scattered light, $E_{bg}+E_{nf}$, is then directed back towards the beam splitter 68 and further to a detector 73 (such as, for example, a mercury cadmium telluride, MCT, detector, or any other optical detector well suited for the chosen operational wavelength). The output O of the detector 73, which may be amplified by a pre-amplifier (not shown) in close proximity to the detector, is then transmitted to a signal processing block 74 equipped with electronic circuitry for analysis of the output O (as described further below). The block 74 additionally provides, through operational communication with the controller 76 and/or actuator 78, a feedback signal that governs the operation of the optical element 72 and the processing of the reference signal in combination with the scattered light signal and detected by the detector. The purpose of controller 76 and actuator 78, including the positioning of mirror 72, will become more apparent from the description below.

Source of Light.

The source light for use with the present embodiment can generally emit either coherent monochromatic or broadband electromagnetic radiation. It may be preferred, however, to utilize a rapidly tunable, electronically controlled, monochromatic source 66 with a linewidth that is narrower than about 1 cm$^{-1}$ and a peak power of at least 1 mW, and which additionally is operable to operate in a pulsed mode. Such choice enables imaging at a single, well defined frequency while still retaining the ability to carry out a spectroscopic measurement by rapidly tuning the laser and repeating the measurement of the near-field interaction between the tip 60 and the sample surface 64.

In one example, a monochromatic source 66 may include a tunable external cavity Quantum Cascade Laser (QCL), which is routinely capable of producing an average spectral power density of greater than 10 mW/cm$^{-1}$ with a tuning spectral range spanning over 100 cm$^{-1}$. As best understood, such a spectral density is at least a factor of 1000 higher than other state of the art methods for producing broadband, coherent laser radiation over a bandwidth of 100 cm$^{-1}$, using methods such as difference frequency generation. The advantage in spectral power density enables the acquisition of near-field signals with sufficient signal-to-noise performance for a 20×20 nm sample area on a sub-millisecond data acquisition timescale. Such an acquisition rate is essential to display a near-field image in real-time, simultaneously with an AFM image, for which a scan rate of 1 Hz or greater is preferred.

The operation of the laser source 66 in a pulsed regime may be preferred because such operation provides 1. the ability to trigger pulses at specific times during which a near-field interaction is at a desired state, i.e., a maximum or a minimum (see discussion of background subtraction/suppression below);
2. the ability to combine such laser pulses with the distance correlated signal; discriminator to z-gate the near-field nanoantenna-sample surface interaction;
3. the ability to reach larger peak power during the time of the pulse (which elicits a stronger near-field response, making the optical detection easier);
4. the ability to perform a time resolved near-field measurement;
5. reduced generation of heat in the system (which has the potential to enhance the performance of the system by increasing its stability and broader tunability);
6. reduced generation of heat generation at the nanoantenna-sample interface (which reduces thermally-induced vibrational noise in the nanoantenna structure, and also produces a less disruptive since the temperatures of the nanoantenna and sample are increased to a lesser amount than in the case of a CW laser excitation);
7. typically lowered cost (due to a decreased design complexity and lower cooling requirements over those for CW lasers.

With respect to the spectral output of the laser source 66, the spectrally-continuous operation may not necessarily be required for the purposes of nano-ID of the sample 64, because the shape of the entire absorption spectrum may not be necessary to successfully characterize or assess the sample region. The sampling points (representing, for example, absorption characteristic of the sample) at several appropriately chosen spectral frequencies is oftentimes sufficient. Accordingly, the use of a laser source 66 characterized by the above-mentioned spectral density of output light at a select set of sampling frequencies separated from one another by as little as 0.01 cm$^{-1}$ may be preferred over the continuously-tunable laser source, since it may allow for a far more rapid nanoidentifying a material of the surface 64 by its chemical signature. (Existing broadband laser sources, for example, render the frequency tuning with stated spectral resolution problematic.) In practice, the user may decide to choose the set of sampling frequencies of interest based on spectral absorption lines of the sample 64, and acquire near-field signals only at those frequencies, thereby further reducing the time required for the measurement.

Interaction Between Optical Nanoantenna and Nearby Sample Surface.

Turning now to FIGS. 3A and 3B, and in further reference to FIG. 2, the interaction between the nanoantenna (AFM tip) and the sample surface, and the corresponding back scattering of source light incident thereon is illustrated. FIG. 3A illustrates a situation when the separation between the AFM tip and the SUT exceeds a certain critical distance, while FIG. 3B illustrates when such separation is well below such critical distance. As described below, in one of these extreme cases the backscattered light contains the information of the near-field tip-sample interaction, while in another such information is not present due to the lack of such physical interaction. Embodiments of the invention are used to assess absorption characteristics of the SUT from the near-field interaction represented by light back-scattered frim the tip-sample region.

In FIG. 3A, where the nanoantenna 90 (e.g., tip 60 of the AFM 54 of FIG. 2) is shown to be separated, from the sample surface 92, by a distance $z_{max}$. When $z_{max}$ exceeds a certain threshold distance, the near-field interaction between the nanoantenna and the sample surface is minimal and, in a specific case, substantially non-existing. As a result, backscattered light collected by the optic 70 of FIG. 2 (that focuses the incident source light onto the nanoantenna 60, 90) is substantially entirely dominated by background radiation $E_{bg}$ emanating from the nanoantenna 60, 90 itself. It is appreciated that the threshold separation distance depends on the dimensions of the nanoantenna. As a specific example, when sizes of the nanoantenna in two dimensions are much smaller than 100 nm, the threshold distance can be considered to be about 100 nm. In practical terms, such assessment of the threshold separation distance would be practically correct for an AFM tip 90 with a radius of curvature, at its apex 62, is about 20 nm or less. Notably, it is the near-field effect that allows super-resolution. Far-field radiation can be indicative of absorption too, as demonstrated in conventional spectroscopy, but far field spectroscopy does not provide nanoscale resolution.

With reference to FIG. 3B, when the tip apex 62 is placed is separated from the surface being measured by a distance less than the threshold distance (for example, at a minimal distance $z_{min}$ corresponding to the oscillation above the surface 64, 92), the tip 60, 90 and sample 64, 92 may experience a near-field interaction that is represented in backscattered light. Specifically, incident onto the tip-sample region source light polarizes the nanoantenna 60, 90 at the frequency of the incident light to create an asymmetric charge distribution along the nanoantenna 60, 90 such that the change density is the highest at the sharpest point(s) (at the apex 62), by analogy to the formation of charge distribution at a lightning rod exposed to an electric field. The formed charge density oscillates (from positive to negative and back) in time at the frequency(ies) of the incident source light, thereby creating a rapidly decaying electromagnetic near-field, which is also varying in time at the optical frequency or frequencies of the incident light. Provided that the sample surface 64, 92 is sufficiently close, the near-field of the nanoantenna 60, 90 experiences reflection off of the sample surface 64, 92, as determined by the sample region's momentum and frequency-dependent reflection coefficient, r(k, ω), additionally altering the dynamic charge distribution at the nanoantenna.

For instance, if the sample surface is made of material that is highly reflecting at the frequencies of incident source light (such as gold, for example), the reflection of the nanoantenna's near-field by the sample surface will provide an additional polarization of the nanoantenna, driving more charges to tip apex 62. To the contrary, if the sample region under the tip 60, 90 absorbs at a particular frequency associated with the incident source light, the reflection of the near-field by the surface will be characterized by a partially imaginary coefficient, Im{r(k, ω)}>0, resulting in a phase delay in the dynamic charge distribution at a point closest to the sample (i.e., at the tip apex 62).

Because the far-field radiation of the nanoantenna 60, 90 depends on its entire charge distribution, some portion of the far-field radiation will be due to the dynamic charge density undergoing the near-field interaction. Therefore, in the case of FIG. 3B ($z_{min}$ is less than the threshold separation distance), the electromagnetic field radiated by the nanoantenna 60, 90 has a complex-valued component, $E_{nf}$, that is also collected by the optic 70. The complex-valued component has amplitude and phase sensitive to the amplitude and phase of sample region's reflection coefficient, r(k, ω).

Referring again to FIG. 2, the aggregately collected from the tip-sample region backscattered radiation is directed towards an optical detector 73, where it is interferometrically combined with a reference electromagnetic field, $E_{ref}$. For a square law detector 73 (such as an MCT), the detector output O is typically a (pre-amplified) voltage proportional to the square of the sum of the complex-valued electric fields:

$$V_{det} \sim EE^* = |E_{ref} + E_{nf} + E_{bg}|^2 \quad (1)$$

Or, $$V_{det} \sim E_{ref}E_{nf}\cos(\phi_{ref}-\phi_{nf}) + E_{bg}E_{nf}\cos(\phi_{bg}-\phi_{nf}) + E_{ref}E_{bg}\cos(\phi_{ref}-\phi_{bg}) + E_{ref}^2 + E_{nf}^2 + E_{bg}^2 \quad (2)$$

By obtaining information about the complex-valued $E_{nf}$ from the output O of the phase-sensitive detector 73, it is possible to gain information about r(k, ω) at the frequency or frequencies of the incident-onto-tip 60, 90 light from the light source 66. The imaginary part of $E_{nf}$ is related to the imaginary part of the reflection coefficient Im{r(k, ω)} which can, in turn, be used to assess absorption, Im{n(k, ω)}, of incident light by the sample.

According to the idea of the invention, the determination of a chemical characteristic of the sample 64, 92 is further effectuated by comparing the measured value of Im{n(k, ω)} to a reference absorption spectrum from a database of results of previously-carried-out measurements (for example, to an absorption spectrum of a known material sample measured at time different from the time of the measurement of the current SUT). The connection to the absorption spectrum makes knowledge of the complex value of $E_{nf}$ highly desirable in order to separate the reflection-like contributions of Re{n(k, ω)} from absorption contributions Im{n(k, ω)}.

Complex-Valued Near-Field of Irradiated Nanoantenna and Need to Suppress Background Backscatter.

The determination of the complex-valued $E_{nf}$ is challenging for at least two reasons: (i) the contribution of $E_{nf}$ to the detector output has to be discriminated from or against $E_{bg}$ (that is, background suppression is required), and (ii) the measurement of a complex-valued $E_{nf}$ requires phase-sensitive detection.

Because $E_{nf}$ is sensitive to the nanoscale optical properties of the region of the sample 64, 92 under the nanoantenna 60,90, it is the $E_{nf}$-containing terms in Eq. (2) that are relevant for the purposes of assessment of the chemical makeup of the sample region at the nanoscale. Given that both the amplitude and phase of light in the reference arm of the interferometer, $E_{ref}$ and $\phi_{ref}$, can be controlled by the user, the first cross-term in Eq. (2) is of particular interest.

The determination of the first cross-term of Eq. (2) (for example, the isolation of this term from other terms in Eq. (2)) can facilitate the determination of the near-field phase $\phi_{nf}$ based on the phase difference between the reference and near-field radiation. The other terms in Eq. (2) may not be particularly useful as means of determining the near-field phase since typically only the phase of the reference field in the reference arm of the interferometer 52 can be controlled.

Determination of Phase of Near-Field Signal with Existing Techniques and Its Shortcomings.

The determination of the near-field phase is often carried out as mentioned above—with the use of a pseudoheterodyne technique (see, for example, Ocelic and Hillebrand, *Pseudoheterodyne detection for background-free near-field spectroscopy*, App. Phys. Letts., September 2006). In reference to FIGS. 2, 3A, 3B the pseudoheterodyne method employs modulation of the mirror 72 at frequency M to create a periodically varying reference phase, $\phi_{ref}(t)=\sigma \cos(Mt)$. In addition, when the AFM 56 of the system 50 is operated in a tapping mode, the near-field interaction between the nanoantenna 60, 90 and the sample 64, 92 is modulated at the tapping frequency $\Omega$. Using frequency domain methods such as lock-in detection, it is then possible to isolate the sought-after $E_{ref}E_{nf}$ term in frequency domain by demodulating the detector output voltage $V_{det}$ only at frequencies $f_{nm}$ that are sums or differences of the harmonics of the tapping frequency $\Omega$ and the harmonics of the frequency of modulation of the tip-sample interaction: $f_{nm}=n\Omega+mM$ (where, for example, m=1, 2 and n>1). The use of higher harmonics of the tapping frequency for demodulation of the optical signal is explained by the fact that the near-field tip-sample interaction and, therefore, $E_{nf}$, are nonlinear with tip-to-sample separation distance z, while the background term, $E_{bg}$, typically is not. At the same time, the modulation of the reference phase $\phi_{ref}$ offers a means of separating the phase and amplitude of the $E_{nf}$ term, since the measurements of $E_{ref}E_{nf}\cos(\phi_{ref}-\phi_{nf})$ at multiple values of $\phi_{ref}$ are made possible.

While arguably effective at isolating the near-field term in Eq. (2) and offering a means to determine its amplitude and phase, the pseudoheterodyne method suffers from some serious limitations.

First, in order to allow for use of this method, the tip-sample separation distance z distance must be varied strictly sinusoidally so as to avoid higher harmonic artifacts in the demodulated signals. (Incidentally, such strict requirement rules out the practical use of AFM feedback mechanisms such as PeakForce Tapping® or Force Modulation, since the use of these feedback mechanisms does not employ a strictly-sinusoidal variation of the separation distance z.

Second, in order to determine the amplitude and phase of the near-file contribution $E_{nf}$ to the back-scattered radiation, the pseudoheterodyne technique necessarily requires distinguishing of sidebands separated by a frequency M in frequency space. This limits the speed of s-SNOM measurements, since integration time at least on the order of 1/M is necessary to avoid a crosstalk between adjacent sidebands (at mM and (m+1)M) and the carrier frequency, $n\Omega$.

Additionally, the pseudoheterodyne method requires the use of CW or quasi-CW laser source, since the use of pulsed lasers creates, in the pseudoheterodyne approach, an additional complication of having to perform triple demodulation to account for the pulse repetition rate.

Moreover, the pseudoheterodyne method does not offer a means to determine the absolute phase $\phi_{nf}$ of the near-field term $E_{nf}$, but instead allows for the determination of only a relative phase value, i.e., ($\phi_{nf}$+C). Since the phase offset C is generally arbitrary and susceptible to drift, it has been well accepted in the art that it is necessary to provide for a reference, "etalon" sample or material to be able to determine the phase $\phi_{nf,0}$ of the near-field interaction between the tip of the probe with the reference region to precisely determine the value of offset C. The reference region or reference material has to be measured in real time, substantially contemporaneously with the measurement of the SUT itself (in practice—within seconds) since the offset C is highly susceptible to drift due to changes in the ambient.

Accordingly, the methodologies of the related art have to place the reference material on the surface of the SUT in the proximity of the ROI of the SUT to be measured (in practice—within about 250 micron distance from the ROI to be measured, since the 250 microns is about a maximum range of reach for most of AFM scanners). This severely limits the types of samples that can be studied with the s-SNOM technique: a great deal of material sample simply do not have suitable reference regions such as, for example, continuous films of polymer blends, biological samples on rough substrates, pellet samples, to name just a few. As referred to herein, the reference region is understood as a volume of material that has a known complex-valued index of refraction at the frequency of interest, $n(\omega_i)$. In one specific case, it may be preferred that $\text{Im}\{n(\omega_i)\}<0.1$ (corresponding to highly reflective and weakly absorbing materials) or $\text{Im}\{n(\omega_i)\}>100$ (corresponding to strongly absorbing materials).

The latter operational limitation of pseudoheterodyne methodology is particularly constraining, since it complicates every measurement. It is well recognized in the art that measurement of the absolute value of the phase $\phi_{nf}$ which could be used for further assessment of the absorption characteristic $\text{Im}\{n(k, \omega)\}$ of the nanoscale sample region, is required.

Embodiments of the present invention offer a method for assessment of near-field tip-sample interaction that is free of the above-identified shortcomings of the pseudoheterodyne, and that effectuates the determination of the absolute phase term $\phi_{nf}$. At the same time, embodiments of the invention still allow for isolation of the $E_{ref}E_{nf}\cos(\phi_{ref}-\phi_{nf})$ term from the detector output O (that is, extract the data that is background-free) and determine individually the amplitude and phase of the near-field term $E_{nf}$.

Below, the operation of the s-SNOM and the algorithms of the present invention used to perform chemical nanoidentification of the SUT (sometimes interchangeably referred to herein as "nanoID" or "chemID") is now presented in more detail. The component $E_{nf}$ of the detected electromagnetic radiation returned by the s-SNOM system to the optical detector, which is sensitive to the near-field interaction between the nanoantenna (e.g., probe tip (apex)) and the surface of the SUT, is determined with the use of a combination of background suppression/subtraction and a phase extraction.

DSCD Algorithm: Suppression and/or Discrimination of Background Signal to Facilitate the Identification of the Amplitude of Near-Field Signal.

Contrary to the methods of the related art that operates in frequency domain, an embodiment of chemical nanoID s-SNOM system of the invention employs signal-detection in time-domain, which is compatible with the use of pulsed laser sources and AFM operating in Tapping or PeakForce® tapping (PFT) modes. The invention is based on the realization that the useful portion of the signal acquired by the optical detector (that is, the portion sensitive to the near-field interaction between the tip of the probe and the sample) has strongly pronounced dependence on the tip-to-sample separation distance, and manifests in discrimination of the useful portion of the signal from the background based on such strong dependence. This time-domain discrimination algorithm is referred to herein as a distance-correlated signal discrimination (DCSD) method.

As discussed above, the contribution $E_{nf}$ to the aggregate optical signal (collected by the optic 70 from the tip-sample region illuminated with the source light and produced by the near-field tip-sample interaction) rapidly decays with the characteristic separation distance z that is essentially determined by the tip apex' radius, while the second contribution $E_{bg}$ (that of a background signal) remains substantially invariant with the separation distance or, at most, varies with it at a incomparably lower rate as compared to $E_{nf}$.

The DCSD method is configured to employ a principle of gating the separation distance between the tip of the AMF's probe and the sample, according to which only those data points are used from the interferometric information (acquired by the s-SNOM system 50 from backscattering of light from the tip-sample) that correspond to chosen phases of the repeated oscillation of the AFM's tip with respect to the surface of the SUT. As such, the useful optical data is collected at the moments corresponding to some distinct separation distance(s) z between the apex of the nanoantenna (AFM tip) and the sample surface (instead of being collected continuously, for example) while, generally, without explicit knowledge of what such separation distance(s) is. The rest of the data point, even if acquired, may not be used in the calculation. (It is worth noting that, in stark contradistinction with the requirements of the pseudoheterodyne methodology, the acquisition of the interferometric information is carried with modulation of z that does not have to be sinusoidal).

Only for the purposes of the illustration and not limitation, in one specific implementation of the DCSD such moments of time correspond to separation distances that are a maximum separation distance $z_{max}$, a minimum separation distance $z_{min}$, and an intermediate separation distance $z_{med}$ between the tip and the SUT. (The modulation of the separation distances occur in the course of Tapping Mode® or PeakForceTapping® Mode of the AFM operation.) Information about these distinct states of the separation distance z (that is, "distance correlation") is obtained from a control device of the AFM, for example, from the AFM lock-in's phase detector output, or from the PFT detector's/controller's output. In this embodiment, a first difference between signals (for example, voltage outputs from the detector 73) taken at the minimum and the maximum separation distance, $V(z_{min})-V(z_{max})$ can be calculated, followed by the calculation of a second difference $(V(z_{max})-V(z_{med}))-(V(z_{min})-V(z_{med}))$, which includes intermediate ($z_{med}$) separation distance in addition to that at maximum and minimum. The use of the second difference facilitates suppression of the sinusoidal variations in a background component of the aggregate signal.

Synchronization of s-SNOM System Operation with Predefined Spatial Points of Tip-to-Sample Separation.

A related implementation may employ the DCSD approach and phase information received from the AFM lock-in amplifier to synchronously generate laser trigger pulses at the predetermined distinct separation distance(s) (such as $z_1$ and $z_2$; where $z_1$ and $z_2$ are somewhere between $z_{max}$ and $z_{min}$; $z_1=z_{max}$ and $z_2=z_{min}$ in a specific and non-limiting example). In other words, the operation of the laser source 66 of FIG. 2 in a pulsed regime is synchronized, in this example, with the separation distance achieving the $z_1$ and/or $z_2$ values. Such synchronization can be thought of as gating the operation of the pulsed laser source according to the predetermined set of distinct separation distances. The DCSD algorithm then determines the difference between the detector output according to $$V_{DCSD}=V(z_1)-V(z_2), \quad (3)$$

and averages this difference over several up/down iterations of the tip-sample separation. Notably, all background signals varying at a much slower rate are subtracted away, as a result. Random noise may also be averaged away. Ideally, the method is implemented with a single field-programmable gate array devices (FPGA) that performs the AFM lock-in, laser pulse triggering, and DCSD of the optical signal synchronously.

In the discussion below, a specific case of $z_1=z_{max}$ and $z_2=z_{min}$ is chosen for simplicity of illustration only, while it is understood that the gating-based data collection utilized in the present DCSD approach that operates in the time-domain can be generally synchronized with any tip-to-sample separation distance available during the tip oscillation cycle.

Figure 5:
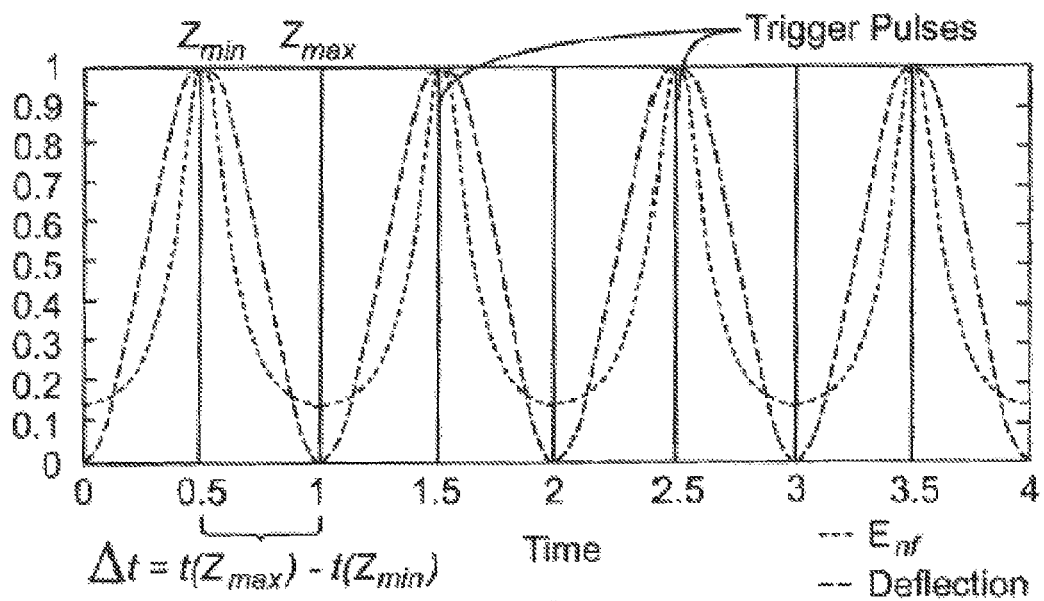
FIG. 5 is a plot of changes in amplitude versus time, illustrating the Z-gating trigger pulses of the Z-gating method according to an embodiment of the invention.

FIG. 5 schematically illustrates, in dashed lines, a plot of the deflection signal (measured with at the AFM 56 of FIG. 2 operating in a Tapping Mode when the tip 60 and the sample 64 are caused to intermittently interact with one another) and a plot of the near-field-interaction related component of radiation $E_{nf}$, collected in the sample arm of the interferometer 52. When the tip and sample are at the closest separation ($z_{min}$), the $E_{nf}$ near-field signal is at a maximum, as expected. To the contrary, when the deflection is small (i.e., the tip is away from the sample at $z_{max}$) the near-field signal is at a minimum on the plot. Notably, the $E_{nf}$ near-field signal is generally not sinusoidal, because the dipole interaction the sample surface and tip do not interact is non-linear vs. distance.

FIG. 5 additionally shows triggering pulses that can be used to trigger the signal detection at the detector 73, according to the DCSD method, based on the knowledge of when the tip-to-sample separation distance reaches its extreme values. The trigger pulses are shown to be separated by a time gap $$\Delta t=t(z_{max})-t(z_{min}) \quad (4)$$

Alternatively or in addition, the same trigger pulses can be used to trigger a laser pulse operation of the laser source of the experimental set-up 50 of FIG. 2 such that radiation emitted by the laser source is delivered to the nanoantenna/tip 60 only at a specified moment corresponding to the chosen separation distances. Alternatively or in addition, the same trigger pulses can be used to trigger signal processing at the unit 74 such that, from all data contained in the detector output O, only those data points are processed and utilized that correspond to the chosen separation distances.

In an embodiment in which it is the pulsed operation of the laser is synchronized with the known separation distances, two laser pulses are repeatedly sent towards the tip of the AFM at the selected times of interest, $t(z_{min})$ and $t(z_{max})$, and the corresponding output voltages of the detector 73 are repeatedly subtracted from one another. This is repeated for several tapping cycles while the tip (and/or sample) is moved up and down, typically many times per second. The voltage difference values $V_{DSCD}$ are continuously accumulated, preferably with the use of integration of the signal difference at $Z_{max}$ and $Z_{min}$, yielding the near-field contribution to the detected signal.

In an embodiment where the system 50 of FIG. 2 utilizes a CW laser source 66, it is the detection of the interaction between the tip and the sample is triggered only at the predetermined times $t(z_{max})$ and $t(z_{min})$ by triggering the detector can be triggered to collect the optical interference signal corresponding only to the $Z_{min}$ and $Z_{max}$ positions. This way, the background contribution $E_{bg}$ can be subtracted from the collected signals and the amplitude of the near-field contribution $E_{nf}$ to the signals detected by the interferometer can be determined.

Figure 6:
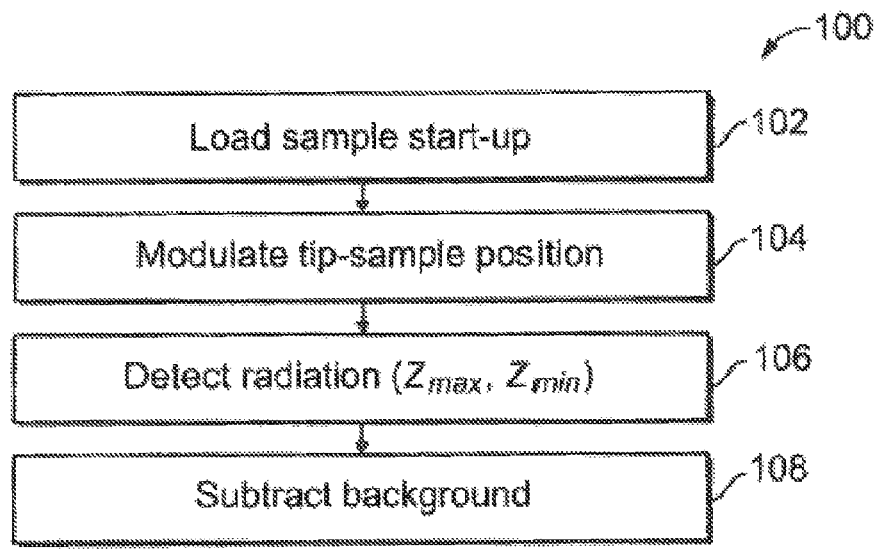
FIG. 6 is a flowchart illustrating major steps of the Z-gating algorithm.

A flow-chart 100 illustrating such z-gating technique is shown schematically in FIG. 6. After loading a sample at a startup and a system initialization step 102, the position between the tip apex and sample is modulated at step 104. The returned from the tip-sample region electromagnetic radiation is then detected at step 106, and the detector voltage output is recorded at the $Z_{max}$ and $Z_{min}$ positions of the tip-sample separation using appropriate z-gating trigger pulses to provide an indication of the background signal. At step 108, the difference between $V(z_{max})$ and $V(z_{min})$ values is integrated in time to provide an indication of the near-field by subtracting out the background contribution to the measured electric field, and to provide the amplitude of the scattered near-field electromagnetic radiation.

In more detail, the measurement procedure 100 performed with the use of z-gated scattering Scanning Near-field Optical Microscopy according to an embodiment of the invention includes:

1) producing input electromagnetic radiation in a range of wavelengths (measured in vacuum) from $\lambda_{min}$ to $\lambda_{max}$ (or, in a range of frequencies from $\omega_{min}$ to $\omega_{max}$), for which one or more laser source of radiation can be used, 2) directing and focusing at least a portion of the produced radiation onto a nanoantenna (a tip of the AFM above the SUT) with the spot that is typically smaller than $10\lambda_{max}$ in diameter as viewed in a plane parallel to the sample surface;

3) mutually positioning the nanoantenna and the sample surface at a distance that exceeds the typical nanoantenna-to-sample separation distance at which the near-field interaction will be present—for example, at a distance z that is larger than 100 nm and less than 1 μm;

4) varying z (in time, preferably periodically with a period T) in a predetermined range that includes a separation distance at which near-field interaction between the nanoantenna and sample is excited, and which generally does not exceed the bounds of 1 μm>z(t)>0 (such as, for example, between 100 nm and 1 nm separation distance);

5) collecting the electromagnetic radiation backscattered by the nanoantenna to form the collected radiation to deliver the collected radiation onto an optical detector (such as a square-law detector);

6) optically interfering the delivered collected radiation at the detector with another, reference portion of the produced radiation that has been time-delayed;

7) manipulating the time-delay of the reference portion of radiation to achieve, maintain and/or control a known phase difference between the reference portion of radiation and the collected radiation;

8) measuring a physically observable detector output, which may be for example voltage $V_{det}$, current, electric field, energy;

9) data-processing the data contained in the detector output (such as $V_{det}$, for example) to extract a near-field portion of the output (for example, $V_{nf}$) representing electromagnetic near-field caused by interaction between the nanoantenna and sample. The step of data-processing of the detector output may include:

9a) isolating the sought-after near field term from the overall detector output by using data representing sampled time-dependent separation distance, z(t) (for example, according to a pre-defined sequence of z(t)-values) between the nanoantenna and the sample and, in a specific case, using data representing the maximum and minimum of the separation distance ("z-gating");

9b) isolating the near-field portion $V_{nf}$ of the detector output by performing a "high-pass background suppression" calculation, in real time on an FPGA (<1 ms per calculation) or in post processing (>1 ms per calculation), to remove from the overall detector output all portions the variation of which does not exceed, in one implementation, about 5% of the corresponding value over the oscillation period T. In a specific implementation, such removal is effectuated according to subtraction $V_{A-B}=V_{det}(z(t_A))-V_{det}(z(t_B))$ where $z(t_A)<5$ nm and $z(t_B)>5$ nm;

9c) Isolating $V_{nf}$ by performing a "high pass and $1^{st}$ harmonic rejection background suppression" calculation, in real time on an FPGA (<1 ms per calculation) or in post processing (>1 ms per calculation), to remove from the overall detector output all portions the variation of which does not exceed, in one implementation, about 5% of the corresponding value over the oscillation period T and any portions varying harmonically at a frequency of 1/T. In one implementation, such calculation is as follows: $V_{A-B+C-D}=V_{det}(z(t_A))-V_{det}(z(t_B))+V_{det}(z(t_C))-V_{det}(z(t_D))$ where $z(t_A)<5$ nm, $z(t_B)>5$ nm, $z(t_C)=z(t_A+T/2)$, and $z(t_D)=z(t_D+T/2)$.

9d) integrating the values such as $V_{A-B}$ (or $V_{A-B+C-D}$, or results of another measurement sequence designed to isolate $V_{nf}$) over determined integration time, τ, to improve the signal to noise ratio (SNR) for $V_{nf}$;

10) calculating a complex valued quantity, NF{($\omega_i$, x, y, z)}, which is related to Re{S($\omega_i$, x, y, z)} or Im{S($\omega_i$, x, y, z)}, the real or imaginary part of the nanoantenna near-field sensitive radiation S($\omega_i$, x, y, z), from a combination of measurements of $V_{nf}$ as described in 9a-9d), where x, y are coordinates indicating positions on the sample surface above which the nanoantenna is placed and z is the nanoantenna-sample separation distance. The step of calculation of a complex-valued quantity NF can be accomplished by the following steps:

10a) acquiring the values of $V_{nf}(x, y, z)$ (according to one or more of the steps 9a-9d) at known, well defined (i.e., non-random) interferometer states for some or all of the electromagnetic frequencies contained in the input radiation 10b) setting at least one of states of the interferometer 52 of FIG. 2 (the interferometer states) as I($\omega_i$, t)=0 or $$I(\omega_i, t) = \frac{\pi}{2}$$

at a time instant chosen in the range between t=0 and t=τ. The setting of the interferometer states can be made either a priori (by means of phase referencing to a reference region of the sample) or dynamically (according to an algorithm that governs the processor of the system 50 to vary I($\omega_i$, t) over a range of values, to monitor the resulting $V_{nf}(x, y, z)$ corresponding to various I($\omega_i$, t), and to effectuate adjustments to an optical path in an interferometric arm required to achieve a I($\omega_i$, t)=0 or $$I(\omega_i, t) = \frac{\pi}{2}).$$

10c) normalizing at least a part (or even all) of the quantity $NF\{(\omega_i, x, y, z)\}$ by $|NF\{(\omega_i, x_{ref}, y_{ref}, z_{ref})\}|$ or some quantity otherwise related to $NF\{(\omega_i, x_{ref}, y_{ref}, z_{ref})\}\}$ where the positions $x_{ref}, y_{ref}, z_{ref}$ are located on a reference region. Normalized near-field spectral data are related to the real and/or imaginary parts of the complex valued index of refraction of the sample region in such a fashion that they can be directly compared to an FTIR spectral data. Normalization can be performed according to, for example, $Re\{NF\{(\omega_i, x, y, z)\}\}/f(NF\{(\omega_i, x_{ref}, y_{ref}, z_{ref})\})$ where the function $f$ can be the absolute value function.

For the purposes of the present disclosure, and unless specified otherwise, the terms "near-field" or "electromagnetic near-field" or a similar term refer to an electromagnetic field $E(r)=E(r)e^{-i\omega t}$ the amplitude of which is detectably decreased (for example, by a factor of e) between first and second spatial positions separated by less than a corresponding free space wavelength. The term "near-field sensitive radiation" or a similar term refer to a propagating electromagnetic wave that undergoes detectable changes in its amplitude and/or phase due to electromagnetic near-fields between the nanoantenna and the surface of the sample under test. Accordingly, a term "near-field insensitive radiation" denotes a propagating electromagnetic wave that does not undergo detectable changes in its amplitude and/or phase due to near-field interaction between the nanoantenna and the SUT. The term "phase referencing" denotes a procedure which determines or relies upon knowledge of the phase relationship between the light incident onto the nanoantenna-sample region and the near-field sensitive radiation.

Figure 7A:
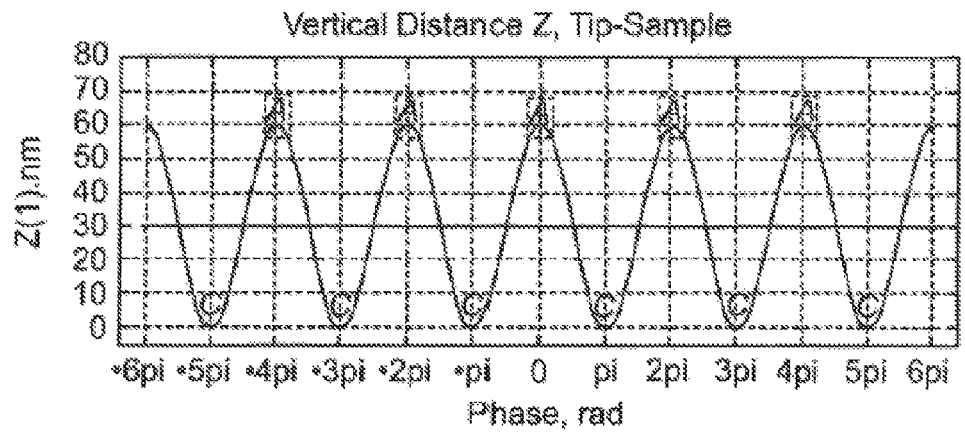
FIGS. 7A, 7B, 7C are plots illustrating embodiments of the Z-gating method under the assumption that the background signal does not change with the separation distance z.

Interferometer State—an optical configuration wherein a portion or multiple portions of the electromagnetic radiation collected from the nanoantenna, referred to as electromagnetic radiation from the "nanoantenna arm", interferes with other portions of the electromagnetic radiation from the same source or sources, referred to as electromagnetic radiation from the "reference path", at the location of the optical detector active area, at a well-defined path difference between the electromagnetic radiation from the "nanoantenna path" and the "reference path". For example, if one collects a nanoantenna radiated electric field $E_{na}=E_{na}e^{-i\omega t}e^{i\theta_{na}}\hat{z}$ and directs another electric field from the reference path $E_{ref}=E_{ref}e^{-i\omega t}e^{i\theta_{ref}}\hat{z}$, such that both interfere at the optical detector active area, then the interferometer state at some time t for $E_{na}$ and $E_{ref}$ is uniquely identified by the phase difference $I(t)=\theta_{na}(t)-\theta_{ref}(t)$. If either of the phases changes at a later time, the interferometer state I may be different. For electromagnetic radiation containing a bandwidth of frequencies, $\omega_1, \omega_2, \omega_3, \omega_4 \ldots \omega_n$, multiple interferometer states exist simultaneously: $I(\omega_1, t), I(\omega_2, t), I(\omega_3, t), I(\omega_4, t) \ldots I(\omega_n, t)=\theta_{na}(\omega_1, t)-\theta_{ref}(\omega_1, t), \theta_{na}(\omega_2, t)-\theta_{ref}(\omega_2, t), \theta_{na}(\omega_3, t)-\theta_{ref}(\omega_3, t), \theta_{na}(\omega_4, t)-\theta_{ref}(\omega_4, t) \ldots \theta_{na}(\omega_n, t)-\theta_{ref}(\omega_n, t)$ For the specific implementation of the s-SNOM system in which the optical data sensitive to near-field interaction between the tip and the SUT is acquired according to the DSCD method of the invention, FIGS. 7A, 7B, 7C and FIGS. 8A, 8B, 8C illustrate background and near-field contributions into the interferometric signal resulting from different assumptions about how the contribution of the background scattering changes with the separation distance z. The tip-to-sample separation distance traces in FIGS. 7A, 8A is shown with a solid line and in FIGS. 7B, 7C, 8B, 8C with dashed lines, and refer to the scale axes on the left of the plots. Background and Near-field signal traces (solid lines in FIGS. 7B, 7C and 8B, 8C) refer to their own scale axes on the right, and presented in arbitrary units (such as, for example, a output voltage signal from the detector).

Figure 7B:
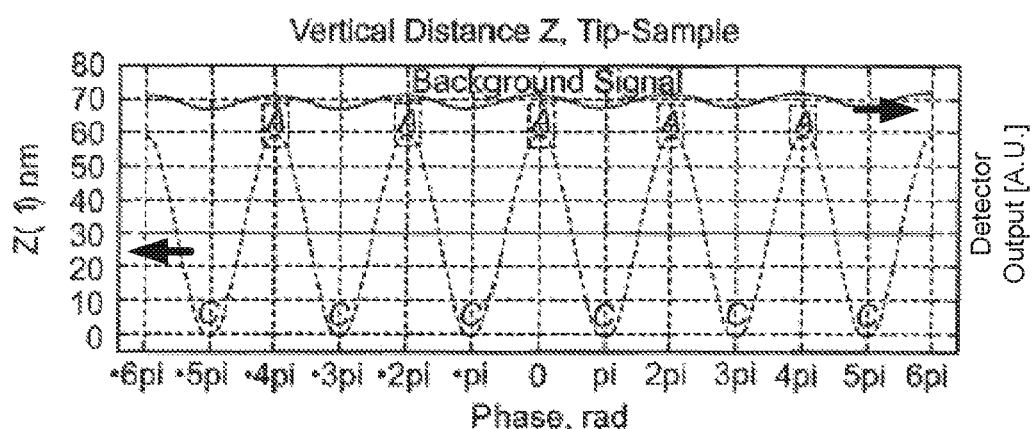
Figure 7C:
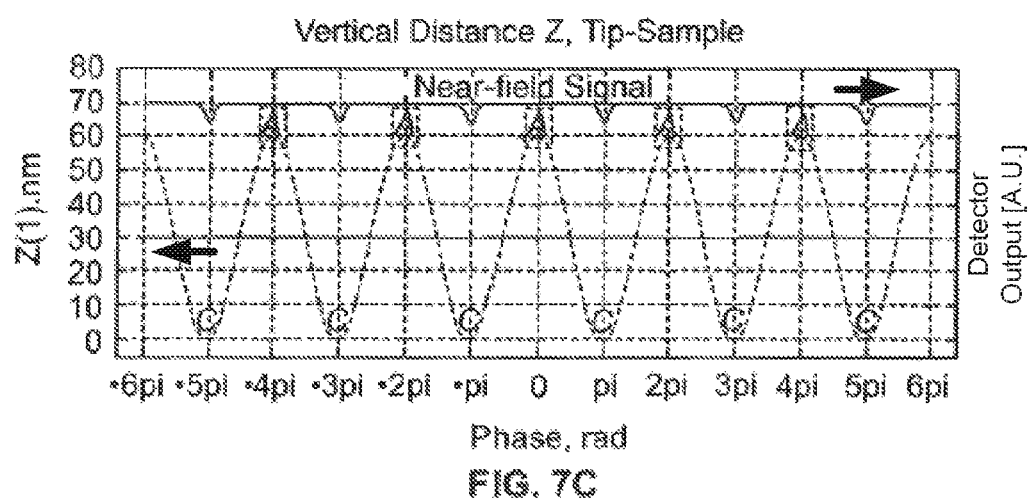
Figure 8A:
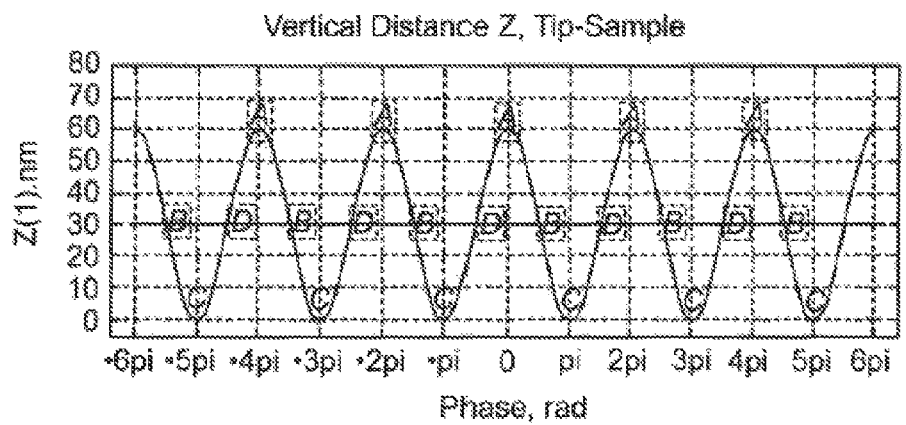
FIGS. 8A, 8B, 8C are plots illustrating embodiments of the Z-gating method under the assumption that the background changes approximately linearly with the separation distance z.

In reference to FIGS. 7A, 7B, 7C, a first order difference scheme is illustrated. Here, the background contribution is considered to not significantly (as far as optical detection at the detector 73 is concerned) change with z, and the behavior of the detected signals is considered to not drastically change over the time of data acquisition (including N periods of tip-to-sample separation modulation, N>>10, for example N=10,000). In addition, the system 54 of FIG. 2 is assumed to use sufficiently large tapping amplitude that is on the scale of the characteristic length of the near-field terms decay. Here, two time windows A and C are considered, respectively corresponding in a specific implementation to measurements at maximum and minimum tip-to-sample separations. The background may be represented by the difference of values measured during these time windows, C−A. That is, the processor of the system 50 of FIG. 2 calculates, according to the DCSD algorithm of the invention, a difference between a sum of n samples acquired at the C time window and a sum of n samples acquired at the A time window (n>>1, for example n=10), and then averages the calculated differences over a sufficiently large number N of periods.

Figure 8B:
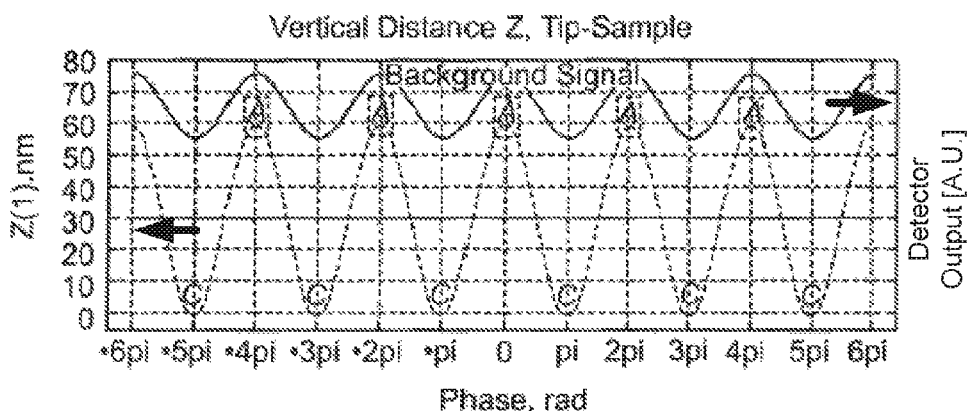
Figure 8C:
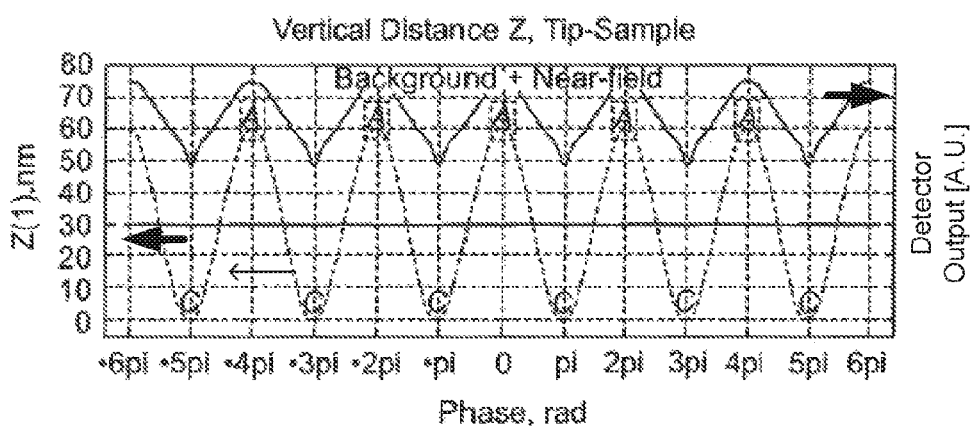

In FIGS. 8A, 8B, and 8C, the second order difference scheme is illustrated. Here, the background contribution to the collected by the optic 70 backscattered signal is assumed to vary linearly with z. Four time windows A, B, C, and D, are considered. In this case, the DCSD calculation scheme can be schematically represented as (A+C)−(B+D)=(A−B)−(D−C). This calculation scheme captures the deviation from symmetry between the signal change from A to B and the change from C to D. Notably, the quantity calculated according to the above expression should be close to zero for background components without near-field contribution.

Overall, according to the DSCD method of the invention, measurement of the optical signal (and, in a specific case, laser pulse triggering in pulsed operation) is performed at moments of time synchronized with specifically-defined positions of the probe of the AFM of the s-SNOM system with respect to the SUT, in the vibration cycle (Z-gated). The relationship between Z oscillation phase and time is preferably established by AFM Lock-in detection. The s-SNOM near-field (NF) signal is discriminated from the background based on the non-linear dependence of the NF contribution from tip-sample interaction. The presence of random noise, if any, in optically acquired data, may require additional averaging to improve the SNR. All signal processing described in connection with the DCSD method is done in the time domain. Also, due to background variation, certain assumptions may have to be made to account for such variations. And, though background suppression is preferably performed with an AFM probe as the nanoantenna in Tapping Mode or Peak Force Tapping Mode, neither harmonic nor strictly periodic motion is required. The motion can be quasi-periodic, or non-stationary.

A person of skill in the art will readily appreciate that, while background suppression is useful for determining the amplitude of the near-field signal, determination of the near-field sensitive electromagnetic radiation $E_{nf}$ for chem-ID is not quite complete because the near-field response also includes a phase component. To facilitate chem-ID with high spatial resolution (on the order of 20 nm or smaller), the phase of the near-field response has to be determined as well. This is preferably accomplished with the "smart phase" methodology employed by the preferred embodiments, described immediately below.

"Smart Phase": Direct Measurement of Absorption of Incident EM-Radiation by of the Sample on Nanoscale.

As mentioned above, s-SNOM related methodologies employed by the related art do not allow for the direct determination of the absolute value of phase of the near-field signal, determining instead a phase modified with an offset that is later subtracted based on a measurement multiply repeated in association with a reference region of the SUT.

One of the goals of the present invention is to provide "reference-region free" normalized near-field imaging and spectroscopy. By normalized near-field data (image or spectra) it is implied that these are data which are related to the real and/or imaginary parts of the complex valued index of refraction of the sample region in such a way that they can be directly comparable to an FTIR spectrum. If a spectrum of a sample region is acquired continuously using an unreferenced method, such as for instance in the pseudoheterodyne method with tunable monochromatic lasers, then the presence of an arbitrary phase offset at every frequency makes the phase spectrum unusable.

An embodiment of a method of the invention provides for the direct measurement of the absolute phase $\phi_{nf}$ of the nanoantenna's near-field dependent radiation $E_{nf}$. The embodiment includes an a priori step of measurement of $E_{nf}$ on a reference sample (i) that is either different from the SUT or that is juxtaposed with the SUT at a distance substantially exceeding 250 microns from the ROI of the SUT that is being measured, (ii) that has a known index of refraction and (iii) that, preferably, possesses substantially no absorption of chosen incident radiation (in which case such reference material adds a predictable phase delay to the radiation of the nanoantenna).

The interferometer state (for example, a position of the mirror 72 of the interferometer 52 of FIG. 2) corresponding to such reference measurement is recorded or noted. Such mirror positioning is done in closed loop, feeding back from the processing block 74 to controller 76, which provides an appropriate signal to actuator 78 to adjust the mirror position. The phase of the reference field in the reference arm of the interferometer, $\phi_{ref}$, may be chosen such that a portion of the detector output O corresponding to the $E_{ref}E_{nf}\cos(\phi_{ref}-\phi_{nf})$ term in Eq. (2) is maximized for a reference material without absorption (such as, for example, intrinsic Silicon in the midIR region of the spectrum) or a reference material without an imaginary component of the reflection coefficient (such as, for example, gold in the midIR region). For such reference materials $\phi_{nf}$ is very close to zero (where zero is the phase of the nanoantenna's background radiation). By setting $\phi_{ref}=\phi_{nf}$, $\phi_{ref}$ is set to 0. For future measurements of a SUT, deviations of $\phi_{nf}$ from $\phi_{ref}=0$ would indicate a phase delay and, therefore, the presence of absorption of the incident source radiation. Furthermore, by recording, on the reference material, the amplitude of the $E_{ref}E_{nf}\cos(\phi_{ref}-\phi_{nf})$ corresponding to $\phi_{ref}-\phi_{nf}=0$, the amplitude of $E_{nf}$ on the sample region can also be determined relative to the reference measurement. In the description of example(s) below, the reference material is assumed to be gold (Au), with understanding that any reference material the index of refraction of which is known at the wavelength(s) of interest can be used. Subsequent measurements of a SUT can then be performed by setting the reference arm of the interferometer 52 such that $\phi_{ref}=0$, $\pi$ to gain information about a real part of $E_{nf}$ or to $\phi_{ref}=+/-\pi/2$ to gain information about the imaginary part of $E_{nf}$.

Having chosen the proper $\phi_{ref}$ to enable a phase-referenced measurement of $E_{nf}$ on the SUT, the embodiment may include an additional step of normalization of a portion of the detector output O that is related to $E_{ref}E_{nf}$ term obtained during the measurement of the SUT. To obtain a both normalized and phase referenced spectrum representing the SUT. Using the "smart phase" referencing alone enables qualitative measurements of the real and/or imaginary part of the near-field $E_{nf}$ corresponding to the tip-SUT interaction (which is useful in a situation where, for example, the detection of an absorption dependent contrast is needed) without quantitative interpretation. However, when the $E_{nf}$ measurement is both phase-referenced and normalized, the obtained spectra become quantitatively comparable to absorption and/or reflection spectra from a standard measurement method such as FTIR.

Figure 9:
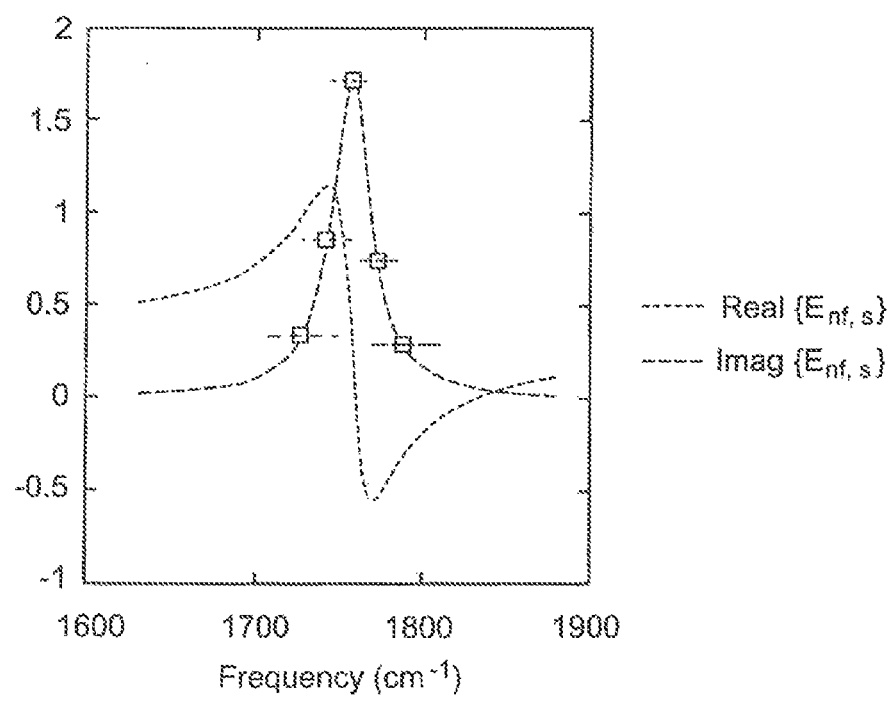
FIG. 9 is a plot of frequency versus amplitude illustrating the measurement of an absorption response of a sample using the apparatus and method of the preferred embodiments.

FIG. 9 shows plots presenting spectral distribution of the calculated real and imaginary parts of the $E_{nf}$ for a PMMA sample, respectively normalized by those of the reference sample of gold. In the calculation, it is assumed that the nanoantenna's radiation in absence of a sample (i.e., the $E_{bg}$ term), defines zero phase. The real portion of the near-field response provides an indication of how reflective the PMMA SUT is (relative to a reference of Gold), while the imaginary part provides an indication of how absorptive the PMMA SUT is. As shown in FIG. 9, the imaginary part of the near-field response includes a peak at about the frequency corresponding to 1758 cm$^{-1}$. A person of ordinary skill in the art will readily recognize this is a characteristic of Plexiglass (PMMA), which has an absorption peak at 1730 cm$^{-1}$ due to the presence of Carbonyl molecule that shifts to a slightly higher frequency in the case of a near-field interaction. The skilled artisan will also appreciate from this disclosure that without the ability to separate the $E_{nf}$ term into real and imaginary parts (or amplitude and phase), it would be difficult to distinguish the contribution of the PMMA absorption to the spectrum. To address such need, the present invention includes a method to properly extract and normalize the real and imaginary parts of the $E_{nf}$ contribution to the interferometric signal detected with the detector 73 of the system 50 of FIG. 2.

Figure 10:
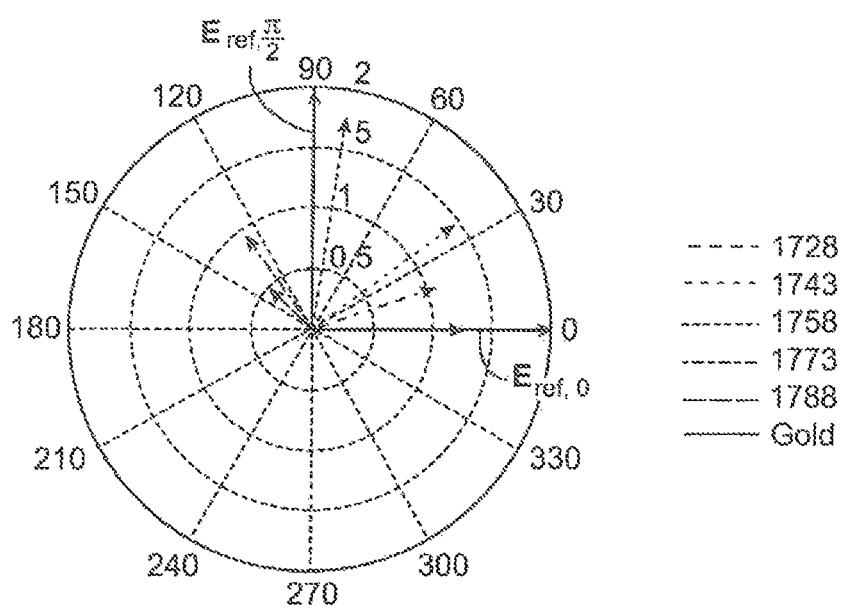
FIG. 10 is a polar plot of the near-field response assessed with the use of an embodiment of the apparatus and method of the invention and illustrating a $\pi/2$ phase shift used to normalize spectra according to an embodiment.

Turning to FIG. 10, a polar plot includes vector representations of the $E_{nf}$ spectrum of FIG. 9 at five laser frequencies (indicated in cm$^{-1}$). For comparison, also shown is a vector representing the calculated $E_{nf}$ for a gold reference, which reference vector extends along the zero degree (0°) position (entirely in phase with the nanoantenna radiation in absence of the SUT, $E_{bg}$), indicating that the near-field contribution from the gold reference to the nanoantenna's radiation is always entirely real for a wide range of frequencies and introduces a practically zero phase delay. It is appreciated that the amplitude of the real part of $E_{nf}$ corresponding to the gold reference can vary due to antenna effects, so the length of the reference vector may not remain constant unlike its phase. The fact that the reference arm of the interferometer 52 is set such that $\phi_{ref}=0$, $\pi$ to gain information about a real part of $E_{nf}$ for near-filed interaction between the AFM tip and the PMMA sample or to $\phi_{ref}=+/-\pi/2$ to gain information about the imaginary part of $E_{nf}$ for near-field interaction between the tip and the PMMA sample is illustrated by the $E_{ref,0}$ and $E_{ref,\pi/2}$ vectors. Subsequent dot products of the $E_{ref,0}$ vector with any $E_{nf}$ vector unambiguously yield the real part of $E_{nf}$, while a dot product of the $E_{ref,\pi/2}$ vector with any $E_{nf}$ yields the imaginary part of $E_{nf}$.

Previously used methodologies 9 such as a pseudoheterodyne measurement), while performing measurements at two separate phases, did not take care to reference the zero position such that $E_{ref,0}$ had a known physical interpretation (that is, no absorption).

It is appreciated, therefore, that, according to the "smart phase" referencing method, a vector representing the reference field corresponding to a zero imaginary reflection contribution (a no-absorption reference material) is identified and allows for the "smart" alignment of said vector along either the imaginary axis $\phi_{ref}=\pi/2$ or the real axis $\phi_{ref}=0$. The product of the reference vector and the near-field vector corresponding to the measurement of the near-field interaction with the SUT is representative of either real or imaginary portion of $E_{nf}$ corresponding to the measurement of the SUT (FIG. 10). Smart referencing can be complemented with the additional amplitude normalization procedure. In contradistinction with the methods of related art, the reference region or material does not have to be in close proximity to the sample region under test.

Unlike s-SNOM systems of the related art that employ the pseudoheterodyne method for data acquisition, the laser source employed in an embodiment of the present invention does not need to be CW or quasi-CW. Rather than needing the laser to be on continuously to interfere and always excite the near-field, processing the acquired data in the time domain according to the invention allows to avoid using the lock-in detection and to utilize a pulsed source of light. Using a pulsed laser source such as a quantum cascade laser (QCL) facilitates the use of a wider tuning range at the same or lower cost due to the lower cooling requirements of pulsed lasers. In practice, such wider tuning range (about 350 cm$^{-1}$ for a pulsed QCL) can be more than twice that achievable by the systems of the related art (about 100-150 cm$^{-1}$ for a CW QCL). Furthermore, some frequencies such as Terahertz are not accessible with CW lasers at all. A larger operational tuning range is highly beneficial for accessing several absorption lines simultaneously for improved material identification. Delivering the nanoantenna excitation in pulses also reduces the possibility of heating or even damaging the sample region or the nanoantenna structure. Ultimately, the broader tuning range and lower heat load delivered to the sample provides a means of discriminating a wider array of materials at a lower cost.

Stabilization of the Laser Source Operation.

It is rather important that, in performing the aforementioned "smart phase" referencing and amplitude normalization procedures, the laser output (including laser frequency, spatial mode profile, power, and polarization, for example) be reproducible from the time the calibration spectrum is acquired on the reference material to the time the measurement on the sample region is performed (for example, on time scale from 10 minute to up to an hour). For example, if the laser mode is not reproducible then the phase relationship between $\phi_{ref}$ and $\phi_{nf}$ may differ on the subsequent measurement resulting in the loss of phase referencing. To achieve the long-term stable operation, embodiments of the invention may utilize temperature and current tuning and/or EC-based control of the frequency of operation of the used laser source. For CW operation, each EC-QCL longitudinal mode has a unique central frequency, 0.01 cm$^{-1}$, so that a precise measurement of the frequency can be used as a mode "identifier". For pulsed lasers, multiple modes coexist with the frequencies typically spread over a bandwidth of 1 cm$^{-1}$ making the precision of the exact frequency measurement a less stringent requirement. For either the pulsed or CW operation mode, mode hops can be induced intentionally around some desired frequency while measuring the output power and the precise central laser frequency. The two measurements together are sufficient to identify what mode the laser is in. Therefore by recording the temperature, current, and exact central frequency achieved at each $\omega$ grating position setting, the QCL output can be made reproducible. By recording a calibration table of these parameters, a reproducible near-field spectrum of $E_{ref}^*E_{nf}$ can be obtained on the reference and sample independently, since the phase and amplitude relationship of $E_{ref}$, $E_{nf}$, and $E_{inc}$ is maintained by keeping the laser output the same.

Examples of Chemical NanoIdentification of Sample Under Test

Figure 4:
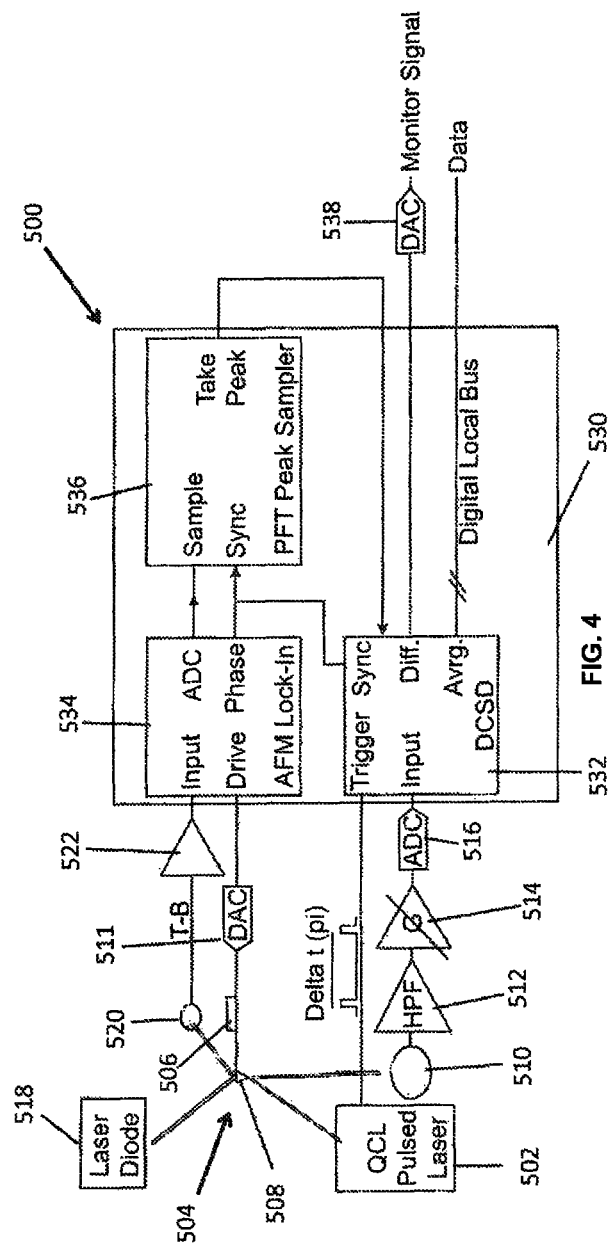
FIG. 4 is a block diagram illustrating the s-SNOM nanospectroscopy system according to an embodiment.
Figure 11:
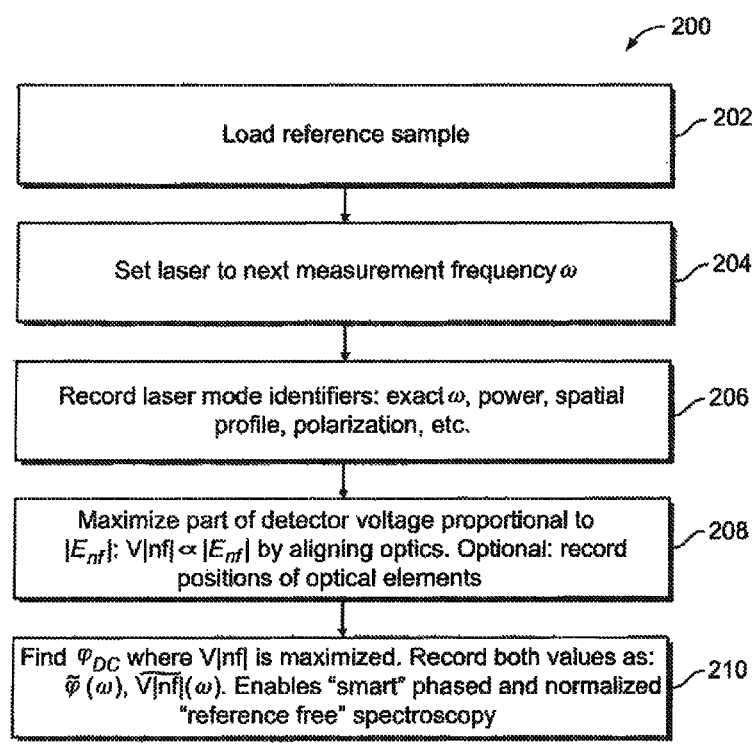
FIG. 11 is a flowchart illustrating the process of normalization/calibration of the s-SNOM measurement data using a reference material.
Figure 14:
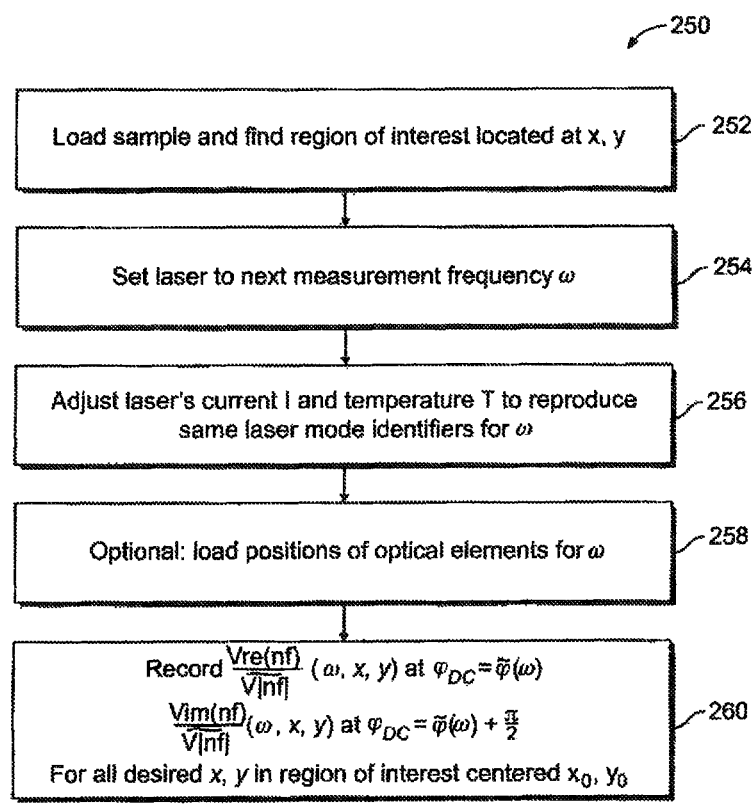
FIG. 14 is a flowchart illustrating a process of obtaining normalized spectra using the calibration method of FIG. 11.

FIGS. 11 and 14 present flow-charts illustrating a process of nano-identification of chemical and/or physical properties of a sample according to the embodiments. Example of electronic circuitry used in the set-up of FIG. 2 is schematically shown in FIG. 4. Initially, prior to performing chemical ID, the system needs to be calibrated with the use of the aforementioned phase referencing and amplitude normalization procedures. Referring to FIG. 11, an embodiment 200 of the calibration method includes selecting a reference sample (made of gold, for example) and loading it into the s-SNOM at step 202. At step 204, the excitation source (laser) is set by the user to emit light at the desired frequency $\omega$. Calibration can be limited to light at those frequencies that correspond to the materials of interest. At step 206, recording laser mode identifiers including exact laser frequency, power, spatial profile, polarization, is carried out. It is these identifiers that will ensure that the same laser mode is reproduced for each frequency when imaging or performing spectroscopy on the region of interest of the sample under test. Thereafter, the optics may be aligned to maximize that part of the detector voltage that is proportional to the absolute value of the near-field radiation $E_{nf}$: $|V_{nf}|\sim|E_{nf}|$. Aligning the optics in this way at step 208 is optional (if employed, positions of the optical element(s) are recorded); alternatively, an assumption can be made concerning the optics already being aligned. At step 210, the phase of light in the reference arm of the interferometer is determined, when $|V_{nf}|$ is maximized. For example, in one embodiment, the reference mirror is adjusted in closed loop to maintain a phase relationship between the reference radiation, $E_{ref}$, and the detected near-field related radiation, $E_{nf}$, from the tip-sample interaction. As a result, for this frequency, the phase, $\sim\phi(\omega)$, and amplitude $\sim|Vnf(\omega)|$ are recorded for use during sample analysis. The procedure is repeated for each measurement frequency returning the method to step 204 and performing the above steps as noted.

Figure 12:
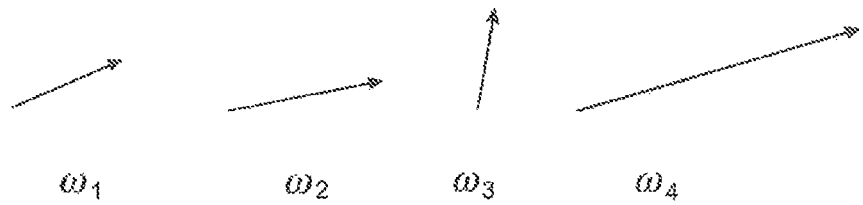
FIG. 12 is a series of vectors illustrating the measured signal $E_{nf}$ for the reference material.
Figure 13:
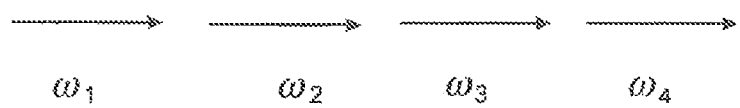
FIG. 13 is a series of vectors illustrating elimination of the phase offset using the smart phase method according to an embodiment.

FIGS. 12 and 13 provide schematic illustrations of differences in the phase relationship between conventional s-SNOM detection (for example, the one utilizing pseudoheterodyne or phase shifting interferometry) for nano-identification and embodiments of the present invention. In FIG. 12, representing related art, the value of the $E_{nf}$ phasor obtained (from $E_{ref}E_{nf}$ term(s)) with the use of a reference material at a plurality of frequencies (shown as $\omega_1$ through $\omega4$) can vary arbitrarily, because the offset between the phase of the reference signal and that of the near-field signal from the nanoantenna or the incident field phase is not adjusted at each measurement. Nor is care taken to reproduce the laser output such that the ratio of $E_{ref}E_{nf}/|E_{inc}|$ is maintained. In stark contradistinction, by performing the above-described normalization procedure ("smart phase"), the phase of the reference signal (corresponding to the direction of the reference vector) can be maintained (for instance, long the real axis: $\phi_{ref}=0$), while the amplitude normalization procedure can be used to normalize the length of the reference vector. As a result, all subsequently repeated measurement of the $V_{nf}(\omega)$ term, with phase referencing and amplitude normalization, will produce processed $E_{nf}$ vectors all have the same length and direction, as one would expect for a spectrally flat reference region such as Gold or Silicon in the midIR frequency range.

With particular reference to FIG. 4, and in further reference to FIG. 2, an implementation 500 of an s-SNOM system for performing the above functions is shown. An output beam from the QCL pulsed laser 502 is directed at the nanoantenna 504 (e.g., a tip 508 of an AFM probe 506) and as the tip interacts with a sample under test (not shown), the scattered light is directed to an IR detector 510 (also see FIG. 2). The detector output is transmitted through an optional high pass filter 512 and thereafter to an optional gain stage 514 prior to being converted to a digital signal with an Analog to Digital converter 516. This is now the signal that is input to a DCSD block 532 algorithm contained on an FPGA 530. As the tip-sample interaction is excited, an actuator, such as a piezo 509, is driven (output of DAC 511), and causes the tip to move toward and away from the sample (though the sample could be moved in an alternative). This motion can be detected using a deviation of the beam from the laser diode 518, that is reflected off of the backside of the probe 506 and detected by a photodetector 520. The output of the photodetector 520 is transmitted to a gain stage 522 and then converted to a digital signal prior to being coupled to the FPGA. Preferably, an AFM lock-in electronic circuit block 534 is provided to determine the phase of the motion of the probe for the reasons described previously, although alternative means of determining the probe-sample separation distance can also be employed. A peak sampler block 536 is also optionally provided (for operating in Peak Force Tapping mode) and the associated detected peak is input to the DCSD block 532 for operation of the above-described DCSD algorithm. DCSD block 532 then outputs the difference between the processed detector voltage when the tip is at specific separation distances, for instance, when it is closest and when it is furthest away from the sample surface, as described previously. That signal is then converted to analog at block 538 and monitored separately. The DCSD algorithm performs averaging and/or accumulates the difference so as to improve the signal to noise in the output.

To reiterate, during the operation, embodiments of the method facilitate either elimination or specific definition of the phase offset between the radiation propagating through a reference arm of the interferometer and the nanoantenna-caused radiation, propagating through a sample arm of the interferometer, by adjusting $\phi_{ref}$ so that it tracks $\phi_{nf}$ that has been measured for the reference material/sample. Thereafter, in a preferred embodiment, the position of the modulating mirror, $\sim\phi_{dc}$, which resulted in the condition $\phi_{ref}=\phi_{nf}$, and the resulting amplitude $\sim V_{nf}(w)$ at that mirror position are recorded to be used for normalization during sample analysis.

To perform a nano-scale chemical identification of a target sample under test with the use of normalized data representing the reference sample (collected at the frequencies of choice, as discussed above in reference to FIG. 11), a process schematically presented with the flow-chart 250 of FIG. 14 can be employed. Initially, as steps 252, 254, 256, the sample under test is loaded into the s-SNOM, a region of interest for testing is identified, and the light source is set to the (next) wavelength ($\lambda$)/frequency ($\omega$) appropriate for the measurement. The current and/or temperature of the laser source are appropriately adjusted to ensure the reproducible and stable laser output, as determined by the aforementioned laser mode identifiers. Optionally, at step 258, the positions of the optical elements of the s-SNOM set up associated with the selected frequency/wavelength of the operation of the laser source are used as inputs corresponding to step 208 of FIG. 11. At step 260, the near-field related contribution to the detector output O (such as the detector voltage, for example) is processed to acquire information about the real and imaginary parts of the near-field radiation term $E_{nf}$. Such acquisition may be accomplished, in one instance, with the combination of smart phase measurement, normalization of the amplitude, and the use of the DCSD background suppression algorithm discussed above. At a given laser frequency, the DCSD output from the detector 73 of FIG. 2 is related to the $E_{ref}E_{nf}$ term of Eq. (2) as follows:

$$V_{DCSD} \sim E_{ref}\Delta E_{nf}\cos(\phi_{ref}-\phi_{nf}) \tag{6}$$

Where $\Delta E_{nf}$ denotes the difference between the magnitudes of the near-field corresponding to the chosen $z_1$ and $z_2$ tip-to-sample separation distance during the probe oscillation cycle.

Then using "smart phase" referencing and amplitude normalization, the following quantities obtained on a reference region or sample (which need not be in close proximity to the sample region under test, and can be separated from it by a distance exceeding a maximum scanning range of the AMF, for example at a distance greater than 250 microns and even be a physically separate, disconnected reference sample measured at a different time), are utilized to reference $\phi_{ref}$ to that of $\phi_{nf}$ of the reference material $$\phi_{ref}(\omega)=\phi_{nf,ref.sample}(\omega) \tag{7A}$$

and to normalize the amplitude of the detector output caused by the measurement of the SUT to that caused by the measurement of the reference material or sample (gold, in one example)

$$V_{DCSD}(\text{ref.sample},\phi_{ref}=\phi_{nf,ref.sample}) \tag{7B}$$

With this relationship, a reference-free SUT nanoabsorption spectrum data can be determined based on the detector output according to:

$$V_{out} = \frac{V_{DCSD}\left(SUT, \varphi_{ref} = \varphi_{nf,ref.sample} + \frac{\pi}{2}\right)}{V_{DCSD}(ref.\text{sample}, \varphi_{ref} = \varphi_{nf,ref.sample})} \sim Imag(\Delta E_{nf}) \tag{8A}$$

Here, a $+\pi/2$ phase shift (or, alternatively, a $-\pi/2$ phase shift) is intentionally added to $\phi_{ref}$ on the SUT measurement, as discussed above, in order to extract the imaginary component of the $E_{nf}$ related DCSD output. A reference sample is chosen among well-known, well-characterized samples and, preferably, is a sample the imaginary part of reflectance of which at a wavelength(s) of interest is minimal or zero. The determination of a ratio of the signals, resulting from the above normalization by the $E_{nf}$-related DCSD output corresponding to the measurement of the reference sample, principally distinguishes methodology of the present invention from any methodology of the related art as it allows to directly compare the output voltage of the s-SNOM apparatus with the FTIR data (i.e., quantitatively relates the output voltage of detector of the s-SNOM apparatus to reflectivity and absorbance properties of the SUT). Furthermore, as was already alluded to above, the chosen method operates in time-domain, unlike methodologies of the related art that perform in frequency domain. (Time domain based data processing is better suited for non-stationary non-periodic signals (with time-varying frequency components), for example, when the motion of the nanoantenna above the SUT is not strictly periodic and its characteristics (amplitude, phase, and shape/distortions—higher moments) are varying in time. While Fourier analysis is well suited for continuous, periodic, differentiable signals, Time domain processing is advantageous for transient, non-differentiable signals that can arise when pulsed irradiance is applied.) However, the normalization step is equally applicable in a frequency domain, in which case the measurement and/or determination of the target values (such as phases or the detector output) will be performed at an mth harmonic of the frequency $\Omega$ of oscillation of the optical nanoantenna with respect to the sample, m≥2:

$$V_{out} = \frac{V_{m\Omega}(SUT, \varphi_{ref} = \varphi_{nf,m\Omega,ref.sample} + \frac{\pi}{2})}{V_{m\Omega}(ref.sample, \varphi_{ref} = \varphi_{nf,m\Omega,ref.sample})} \sim Imag(\Delta E_{nf,m\Omega}) \quad (8B)$$

Using the s-SNOM system of FIGS. 2, 4, a reference free measurement can be obtained where the sample region is not in close proximity to the reference region or is measured a short time (on the order of seconds) after the reference region. In particular, using knowledge of what $\phi_{ref}$ value corresponds to $\phi_{nf}=0$, each value of $\phi_{nf}$ that is different from zero is explicitly and directly assigned to and/or associated with absorption characteristic at the sample surface. This direct correspondence defines an absolute direction and/or orientation of the $E_{nf}$ phasor (see FIG. 10), unlike the implementations available from related art the direction could only be determined relatively to a measurement obtained on another, reference material disposed in close proximity (and within the range of scanning of the SNOM system) of the measured area of the SUT. As noted previously, this procedure can be performed on a separate reference material or region prior to image/spectra acquisition on the sample of interest. Overall, live quantitative measurement of "nano absorption" Imag($E_{nf}$) or "nano reflection" Re($E_{nf}$) is possible without additional postprocessing, and "point and shoot" IR nano spectroscopy at single locations can be performed, contrary to the state-of-the-art. The target data characterizing the near-field sensitive electric field are obtained in a form that makes these data directly quantitatively comparable to FTIR spectra.

References throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and in possible connection with a figure, is intended to provide a complete description of all features of the invention.

In addition, it is to be understood that no single drawing is intended to support a complete description of all features of the invention. In other words, a given drawing is generally descriptive of only some, and generally not all, features of the invention. A given drawing and an associated portion of the disclosure containing a description referencing such drawing do not, generally, contain all elements of a particular view or all features that can be presented is this view, for purposes of simplifying the given drawing and discussion, and to direct the discussion to particular elements that are featured in this drawing. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this detail in the drawing may be implied unless the context of the description requires otherwise. In other instances, well known structures, details, materials, or operations may be not shown in a given drawing or described in detail to avoid obscuring aspects of an embodiment of the invention that are being discussed. Furthermore, the described single features, structures, or characteristics of the invention may be combined in any suitable manner in one or more further embodiments.

Embodiments of the invention—both system and methods—have been described as employing a processor controlled by instructions stored in a memory. The memory may be random access memory (RAM), read-only memory (ROM), flash memory or any other memory, or combination thereof, suitable for storing control software or other instructions and data. Some of the functions performed by the processor to effectuate the steps of the method of the invention have been described with reference to flowcharts and/or block diagrams. Those skilled in the art should readily appreciate that functions, operations, decisions, etc. of all or a portion of each block, or a combination of blocks, of the flowcharts or block diagrams may be implemented as computer program instructions, software, hardware, firmware or combinations thereof Those skilled in the art should also readily appreciate that instructions or programs defining the functions of the present invention may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

While the invention is described through the above-described exemplary embodiments, it will be understood by those of ordinary skill in the art that modifications to, and variations of, the illustrated embodiments may be made without departing from the inventive concepts disclosed herein. Furthermore, disclosed aspects, or portions of these aspects, may be combined in ways not listed above. Accordingly, the invention should not be viewed as being limited to the disclosed embodiment(s).

What is claimed is:

1. A method for optical characterization of a sample (SUT) using evanescent waves, the method comprising:
   detecting, with an optical detector, an optical signal interferometrically formed by
      (i) first electromagnetic radiation backscattered by a nanoantenna in response to being incident electromagnetic radiation, said nanoantenna being controllably movable above a surface of the SUT, and (ii) second electromagnetic radiation representing a portion of said incident electromagnetic radiation, a phase-delay equal to a difference between a phase of the second electromagnetic radiation and a phase of the first electromagnetic radiation being variable;

to form an optical data output;

processing said optical data output in time domain to extract a first portion of said optical data output that represents electromagnetic field caused by near-field interaction between the nanoantenna and the surface during a motion of the nanoantenna above the SUT, wherein the motion includes a recurring motion; and normalizing said first portion of the optical data output, by reference optical data that have been interferometrically acquired in a process of backscattering of said incident radiation by the nanoantenna moving above a surface of a reference sample, to determine at least one of real and imaginary parts of a complex-valued difference between first and second values of electric field characterizing said near-field interaction, wherein the first and second values respectively correspond to first and second phases of the motion.

2. A method according to claim 1, wherein said normalizing includes determining a spectral distribution of said at least one of real and imaginary parts to identify a component of a complex-valued permittivity of the SUT.

3. A method according to claim 2, further comprising suppressing a contribution of background electromagnetic radiation to the first portion of the optical data output to obtain a second portion of the optical data output in which said contribution is reduced as compared to the first portion.

4. A method according to claim 3, wherein said suppressing includes determining of the first portion of the optical data output at first, second, third and fourth phases of said motion as respective first, second, third, and fourth values, and further determining a difference between a sum of the first and third values and a sum of the second and fourth values.

5. A method according to claim 1, further comprising determining at least one of real and imaginary parts of a complex-valued difference between first and second values of electric field that characterizes said near-field interaction to identify a component of a complex-valued permittivity of the SUT based on said complex-valued difference.

6. A method according to claim 1, further comprising processing determining amplitude and phase of electric field representing said near-field interaction from first portion of said optical data to ascertain a dielectric constant parameter and an absorption parameter characterizing the SUT.

7. A method according to claim 1, wherein said incident radiation includes a plurality of wavelengths while the phase of second electromagnetic radiation differs from the phase of the first electromagnetic radiation by an amount that is being modulated, and further comprising analyzing data derived from the optical data output in the time domain with the use of spectral analysis to derive a spectrum representing an interferogram.

8. A method according to claim 7, wherein the phase-delay is being continuously changed in a reference arm of an interferometer according to a periodic function characterized by a modulation frequency.

9. A method according to claim 8, wherein said periodic function includes at least one of linear and sinusoidal functions.

10. A method for optical characterization of a sample (SUT) using evanescent waves, the method comprising:

detecting, with an optical detector, an optical signal interferometrically formed by (i) first electromagnetic radiation backscattered by a nanoantenna in response to being incident electromagnetic radiation, said nanoantenna being controllably movable above a surface of the SUT, and (ii) second electromagnetic radiation representing a portion of said incident electromagnetic radiation, a phase-delay equal to a difference between a phase of the second electromagnetic radiation and a phase of the first electromagnetic radiation being variable;

to form an optical data output;

processing said optical data output in time domain to extract a first portion of said optical data output that represents electromagnetic field caused by near-field interaction between the nanoantenna and the surface during a motion of the nanoantenna above the SUT, wherein the motion includes a recurring motion; and normalizing said first portion of the optical data output, by reference optical data that have been interferometrically acquired in a process of backscattering of said incident radiation by the nanoantenna moving above a surface of a reference sample, to determine at least one of real and imaginary parts of a complex-valued difference between first and second values of electric field characterizing said near-field interaction, wherein the first and second values respectively correspond to first and second phases of the motion, and wherein said normalizing includes determining a spectral distribution of said at least one of real and imaginary parts to identify a component of a complex-valued permittivity of the SUT.

11. A method according to claim 10, further comprising suppressing a contribution of background electromagnetic radiation to the first portion of the optical data output to obtain a second portion of the optical data output in which said contribution is reduced as compared to the first portion.

12. A method according to claim 11, wherein said suppressing includes determining of the first portion of the optical data output at first, second, third and fourth phases of said motion as respective first, second, third, and fourth values, and further determining a difference between a sum of the first and third values and a sum of the second and fourth values.

13. A method according to claim 10, further comprising determining at least one of real and imaginary parts of a complex-valued difference between first and second values of electric field that characterizes said near-field interaction to identify a component of a complex-valued permittivity of the SUT based on said complex-valued difference.

14. A method according to claim 10, further comprising processing determining amplitude and phase of electric field representing said near-field interaction from the first portion of said optical data to ascertain a dielectric constant parameter and an absorption parameter characterizing the SUT.

15. A method according to claim 10, wherein said incident radiation includes a plurality of wavelengths while the phase of second electromagnetic radiation differs from the phase of the first electromagnetic radiation by an amount that is being modulated, and further comprising analyzing data derived from the optical data output in the time domain with the use of spectral analysis to derive a spectrum representing an interferogram.

16. A method according to claim 15, wherein the phase-delay is being continuously changed in a reference arm of an interferometer according to a periodic function characterized by a modulation frequency.

\* \* \* \* \*